US010481311B2

(12) United States Patent
Yanai et al.

(10) Patent No.: US 10,481,311 B2
(45) Date of Patent: Nov. 19, 2019

(54) TRANSPARENT FILM, TRANSPARENT SCREEN, IMAGE DISPLAY SYSTEM, AND TRANSPARENT POSTER

(71) Applicant: FUJIFILM Corporation, Tokyo (JP)

(72) Inventors: Yujiro Yanai, Minami-ashigara (JP);
Michio Nagai, Minami-ashigara (JP);
Akira Yamamoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/197,799

(22) Filed: Nov. 21, 2018

(65) Prior Publication Data

US 2019/0094432 A1 Mar. 28, 2019

Related U.S. Application Data

(63) Continuation of application No. PCT/JP2017/018822, filed on May 19, 2017.

(30) Foreign Application Priority Data

May 24, 2016 (JP) .................. 2016-103555

(51) Int. Cl.
*G02B 5/30* (2006.01)
*G03B 21/60* (2014.01)
(Continued)

(52) U.S. Cl.
CPC ............ *G02B 5/30* (2013.01); *G03B 21/00* (2013.01); *G03B 21/14* (2013.01); *G03B 21/28* (2013.01);
(Continued)

(58) Field of Classification Search
CPC .................................... G03B 21/604
See application file for complete search history.

(56) References Cited

U.S. PATENT DOCUMENTS 10,295,897 B2 * 5/2019 Nagai ................ G03B 21/60
10,310,260 B2 * 6/2019 Yanai ................ G02B 5/26
(Continued)

FOREIGN PATENT DOCUMENTS

| JP | 5-107660 A | 4/1993 |
| JP | 2009-8932 A | 1/2009 |

(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2017/018822, dated Dec. 6, 2018, with English translation of the Written Opinion.
(Continued)

*Primary Examiner* — Christopher E Mahoney
(74) *Attorney, Agent, or Firm* — Birch, Stewart, Kolasch & Birch, LLP

(57) ABSTRACT

Provided are a transparent film that allows scenery to be observed without color unevenness in a state where light is not irradiated, a transparent screen and an image display system including the transparent film, and a transparent poster. The transparent film includes: a support; a dot array that is formed on one surface of the support and in which dots obtained by immobilizing a cholesteric liquid crystalline phase are two-dimensionally arranged; and an overcoat layer that covers the dots and is laminated on the support, in which areas of the dots and distances between the dots are made to be irregular. As a result, the object is achieved.

8 Claims, 18 Drawing Sheets

(51) Int. Cl.
*G03B 21/00* (2006.01)
*G03B 21/14* (2006.01)
*G09F 15/02* (2006.01)
*G03B 21/28* (2006.01)
*G03B 21/604* (2014.01)

(52) U.S. Cl.
CPC ............ *G03B 21/60* (2013.01); *G09F 15/02* (2013.01); *G03B 21/604* (2013.01)

(56) References Cited

U.S. PATENT DOCUMENTS

2006/0232749 A1* 10/2006 Quach .................... G03B 21/28
353/20
2008/0233360 A1* 9/2008 Sekine ................. B32B 38/145
428/195.1
2018/0052264 A1* 2/2018 Saitoh ...................... G02B 5/26
2018/0107106 A1 4/2018 Ichihara et al.

FOREIGN PATENT DOCUMENTS

WO WO 2016/067572 A1 5/2016
WO WO 2016/204067 A1 12/2016

OTHER PUBLICATIONS

International Search Report (Form PCT/ISA/210) for International Application No. PCT/JP2017/018822, dated Jul. 11, 2017, with English translation.

* cited by examiner

FIG. 14
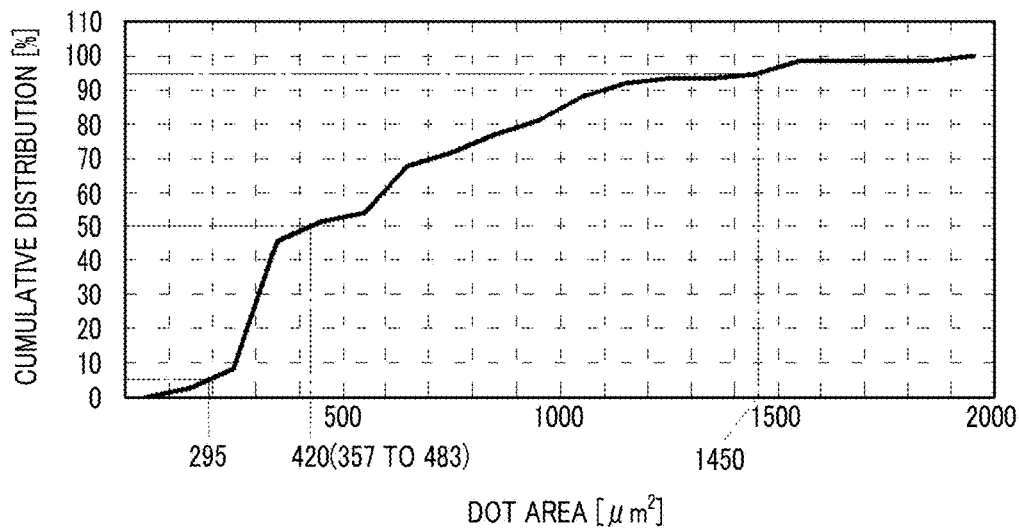
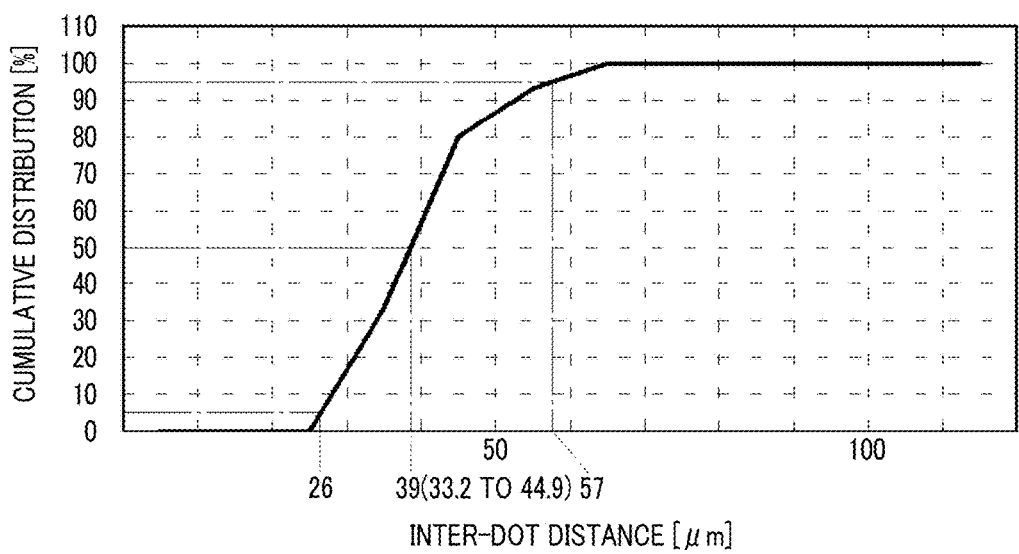

FIG. 16
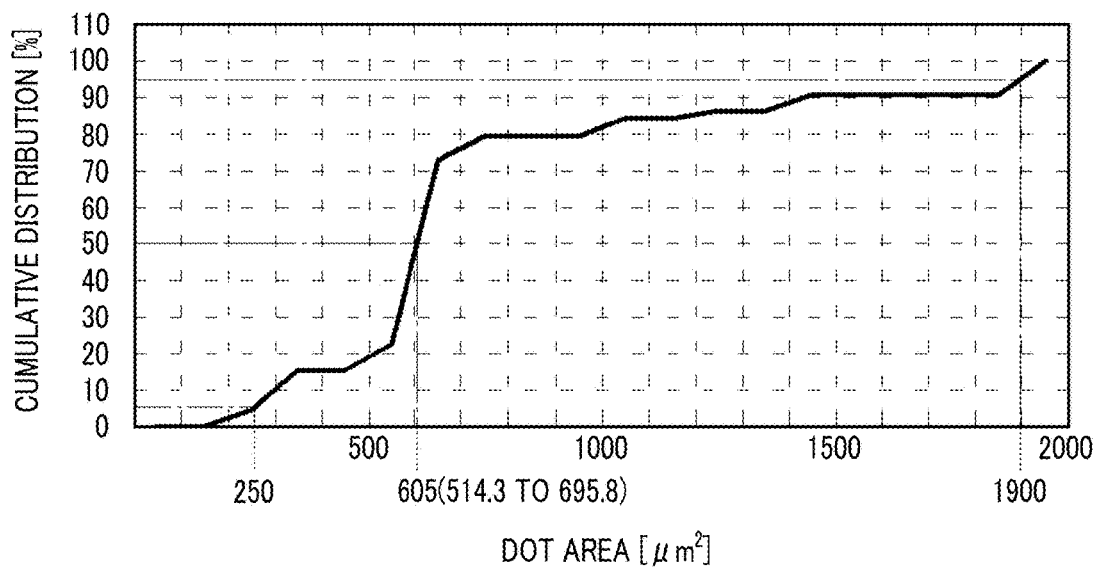
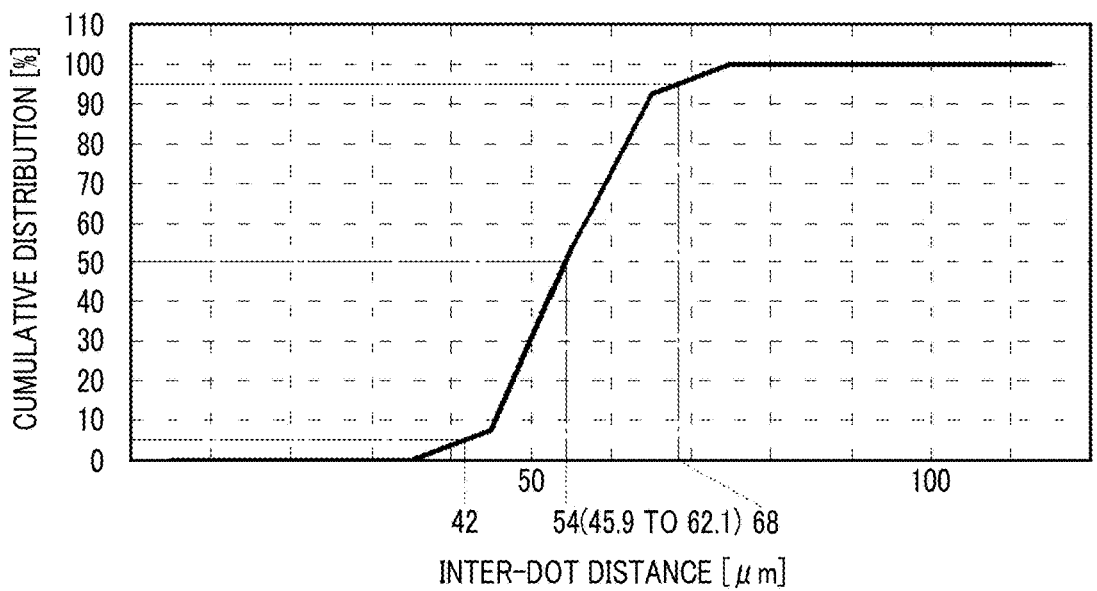

FIG. 18
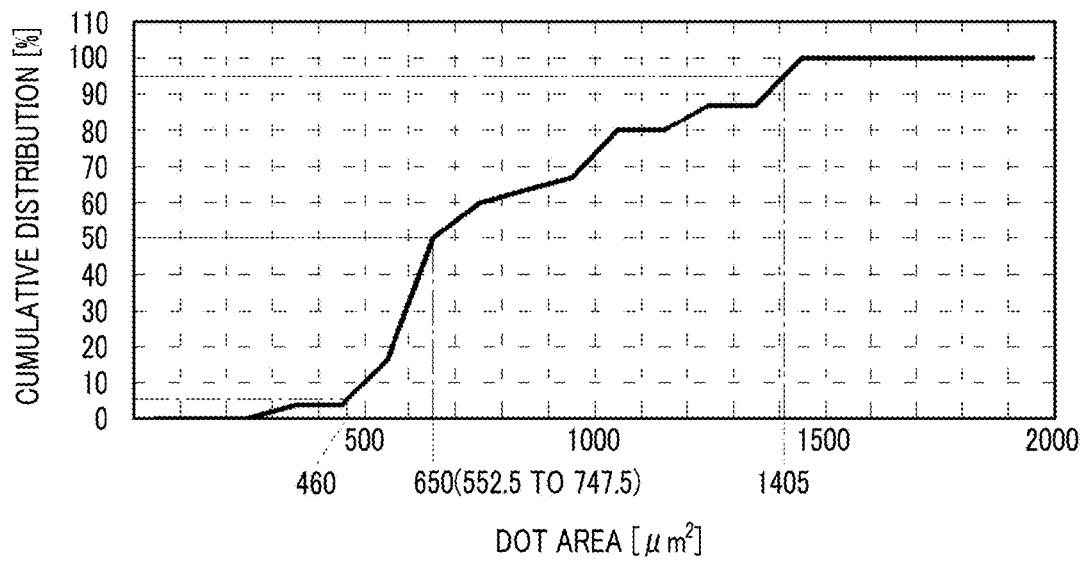
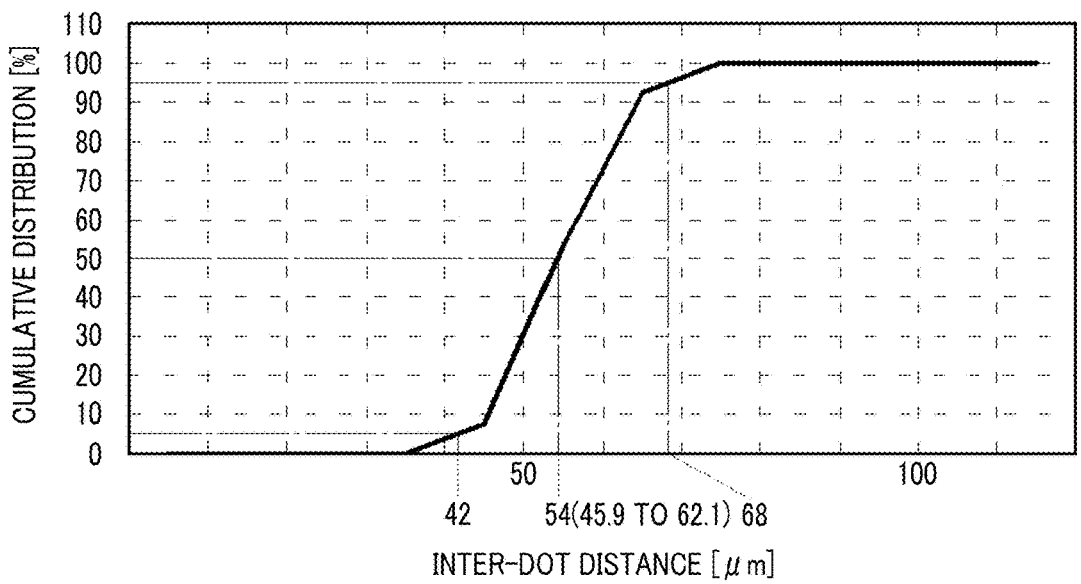

FIG. 20
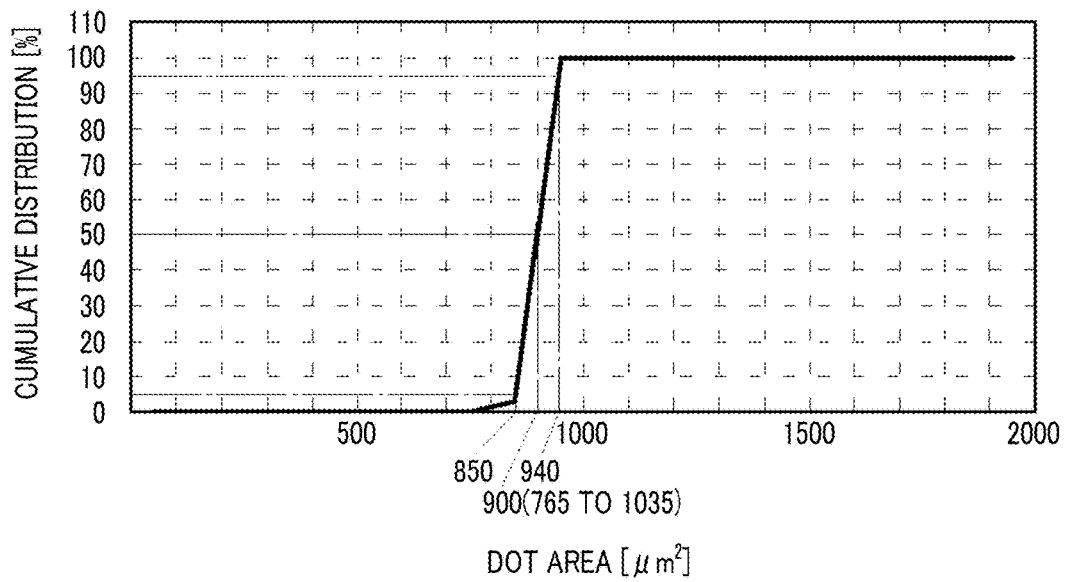
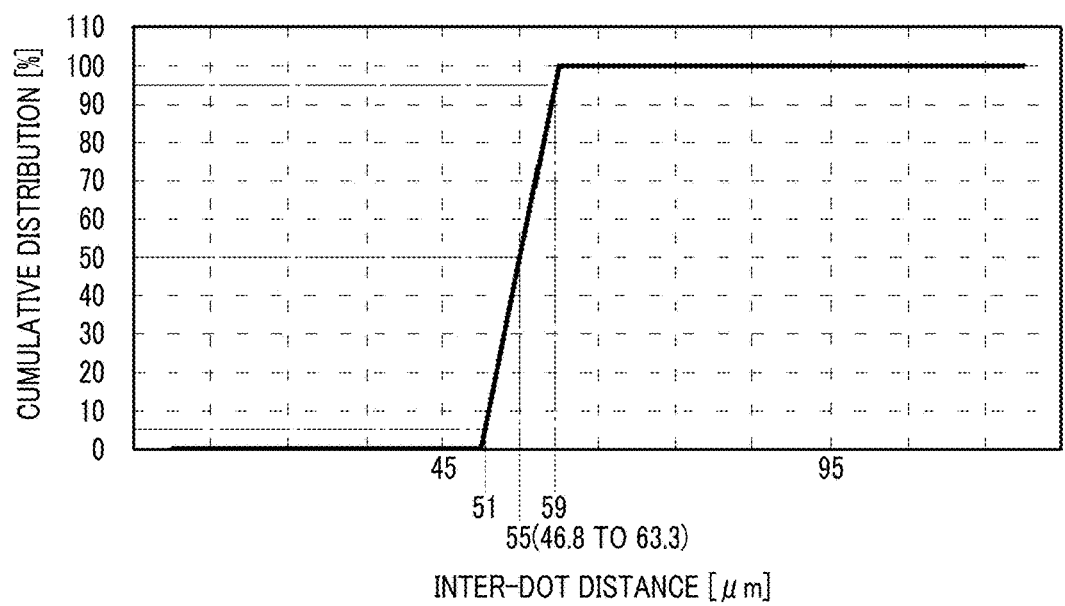

FIG. 22
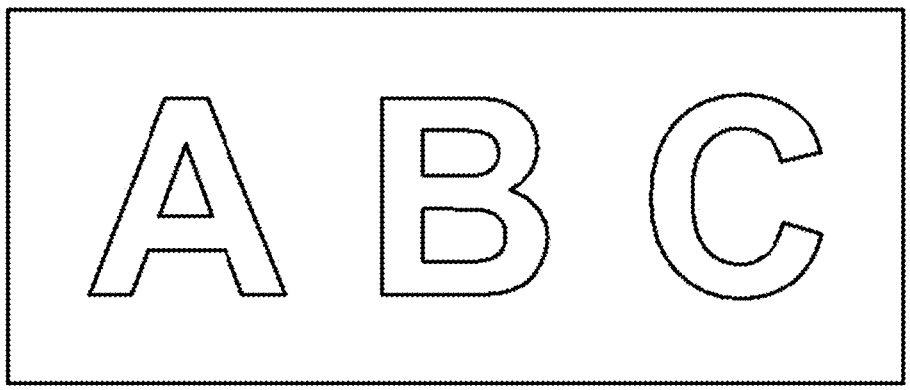
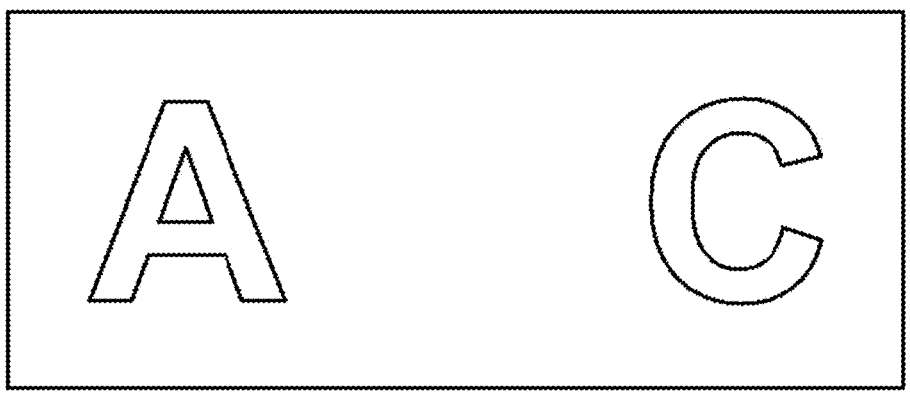
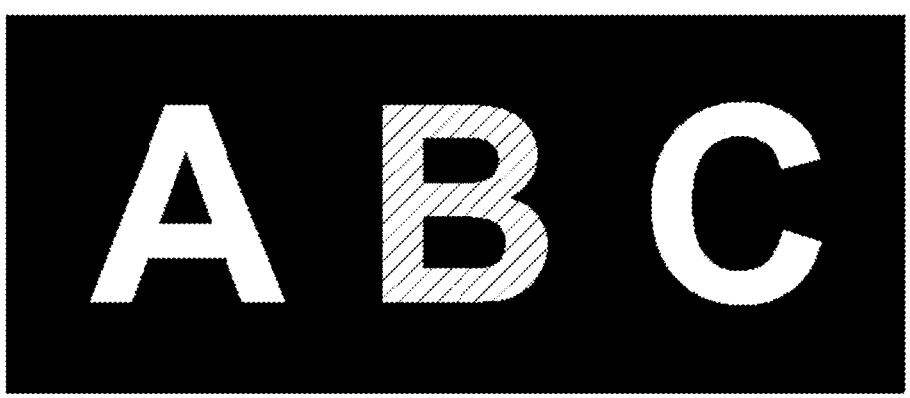

TRANSPARENT FILM, TRANSPARENT SCREEN, IMAGE DISPLAY SYSTEM, AND TRANSPARENT POSTER

CROSS-REFERENCE TO RELATED APPLICATIONS

This application is a Continuation of PCT International Application No. PCT/JP2017/018822 filed on May 19, 2017, which claims priority under 35 U.S.C. § 119(a) to Japanese Patent Application No. 2016-103555 filed on May 24, 2016. The above application is hereby expressly incorporated by reference, in its entirety, into the present application.

BACKGROUND OF THE INVENTION

1. Field of the Invention

The present invention relates to a transparent film used in a transparent screen or the like, a transparent screen and an image display system including the transparent film, and a transparent poster.

2. Description of the Related Art

Recently, as a screen constituting a projection type display device, a transparent screen that diffuses and/or reflects projection light projected from a projector to display an image and allows transmission of light from front and back surfaces is known.

For example, JP1993-107660A (JP-H5-107660A) describes a projection type liquid crystal projection system including a transparent screen in which a cholesteric liquid crystal that reflects red light, green light, and blue light of right or left circularly polarized light is used. In the projection type liquid crystal projection, transmission of a right or left circularly polarized light component of external light emitted to the transparent screen is allowed by polarizing red light, green light, and blue light projected to the transparent screen into right or left circularly polarized light using a λ/4 plate.

SUMMARY OF THE INVENTION

In an image display system including a transparent screen, it is preferable that an image projected from a projector can be appropriately displayed as a visible image, and it is also preferable that scenery (the opposite side of the transparent screen) can be suitably observed through the transparent screen in a state where an image is not displayed (in a state where an image is not projected).

An object of the present invention is to provide: a transparent film that allows, for example, in case of being used in a transparent screen of an image display system, scenery to be suitably observed through the transparent screen in a state where an image is not displayed; a transparent screen and an image display system including the transparent film; and a transparent poster.

In order to achieve the object, according to the present invention, there is provided a transparent film comprising:
a support;
a dot array that is formed on one main surface of the support and in which dots obtained by immobilizing a cholesteric liquid crystalline phase are two-dimensionally arranged; and
an overcoat layer that covers the dot array and is laminated on the support,
in which in a case where, in a cumulative distribution diagram in which a horizontal axis represents an area of the dots, an area of the dots corresponding to a cumulative distribution of 50% is represented by Xs, an area of the dots corresponding to a cumulative distribution of 5% is represented by Ysa, and an area of the dots corresponding to a cumulative distribution of 95% is represented by Ysb, and
in a case where in a cumulative distribution diagram in which a horizontal axis represents an inter-dot distance as a distance between one dot and another dot that is most adjacent to the dot, an inter-dot distance corresponding to a cumulative distribution of 50% is represented by Xd, an inter-dot distance corresponding to a cumulative distribution of 5% is represented by Yda, and an inter-dot distance corresponding to a cumulative distribution of 95% is represented by Ydb, the dot array satisfies at least one of the following Expression (1), (2), (3), or (4), $$Xs \times 0.85 > Ysa \quad \text{Expression (1),}$$

$$Xs \times 1.15 < Ysb \quad \text{Expression (2),}$$

$$Xd \times 0.85 > Yda \quad \text{Expression (3), and}$$

$$Xd \times 1.15 < Ydb \quad \text{Expression (4).}$$

In the transparent film according to the present invention, it is preferable that a difference between an average refractive index of the dots and a refractive index of the overcoat layer is 0.1 or lower.

In addition, it is preferable that each of the dots has a stripe pattern including bright portions and dark portions in a cross-section, and it is preferable that an angle between a normal line perpendicular to a line, which is formed using a first dark portion from a surface of the dot, and the surface of the dot is 70° to 90°.

In addition, it is preferable that an average of the inter-dot distances of the dots is 10 to 100 µm, and it is preferable that an average dot diameter of the dots is 10 to 100 µm.

Further, it is preferable that the dots satisfy at least one of Expression (3) or (4).

In addition, according to the present invention, there is provided a transparent screen that is formed of the transparent film according to the present invention.

In addition, according to the present invention, there is provided an image display system comprising: a transparent screen that is formed of the transparent film; and a projector.

Further, according to the present invention, there is provided a transparent poster that is formed of the transparent film according to the present invention, in which the dots in the dot array are formed in an image shape.

According to the present invention, it is possible to provide: a transparent film that allows, for example, in case of being used in a transparent screen of an image display system, scenery to be suitably observed through the transparent screen in a state where an image is not displayed; a transparent screen and an image display system including the transparent film in which scenery can be suitably observed in a state where an image is not displayed; and a transparent poster.

BRIEF DESCRIPTION OF THE DRAWINGS

FIG. 14 is a cumulative distribution diagram of Example of the transparent screen according to the embodiment of the present invention.

FIG. 16 is a cumulative distribution diagram of Example of the transparent screen according to the embodiment of the present invention.

FIG. 18 is a cumulative distribution diagram of Example of the transparent screen according to the embodiment of the present invention.

FIG. 20 is a cumulative distribution diagram in Comparative Example of the transparent screen according to the embodiment of the present invention.

FIG. 22 is a conceptual diagram showing Example of the transparent poster according to the embodiment of the present invention.

DESCRIPTION OF THE PREFERRED EMBODIMENTS

Figure 1:
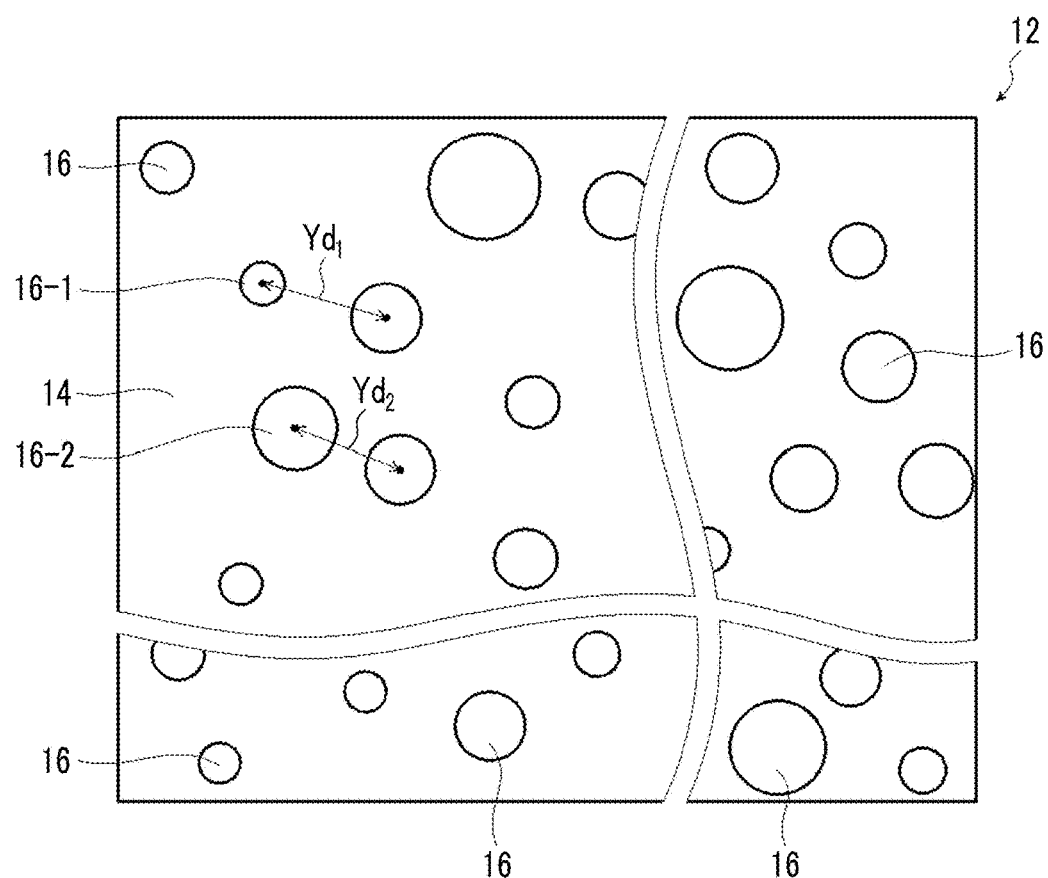
FIG. 1 is a diagram conceptually an example of a transparent screen according to an embodiment of the present invention.

Hereinafter, a transparent film, a transparent screen, an image display system, and a transparent poster according to the present invention will be described based on a preferable embodiment shown in the accompanying drawings.

In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5°. The difference from an exact angle is preferably less than 4° and more preferably less than 3°.

In this specification, "(meth)acrylate" represents "either or both of acrylate and methacrylate".

In this specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In this specification, visible light refers to light which can be observed by human eyes among electromagnetic waves and refers to light in a wavelength range of 380 to 780 nm Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In this specification, retroreflection refers to reflection in which incident light is reflected in an incidence direction.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 to 780 nm)/(Diffuse Transmittance of Natural Light at 380 to 780 nm+Direct Transmittance of Natural Light)×100%

The diffuse transmittance refers to a value calculated by subtracting the direct transmittance from a total transmittance which is obtained using a spectrophotometer and an integrating sphere unit. The direct transmittance refers to a transmittance at 0° in a case where a value measured using an integrating sphere unit is used. That is, low haze represents that the amount of directly transmitted light in the total amount of transmitted light is large.

In this specification, a refractive index is measured using an Abbe refractometer (NAR-4T, manufactured by Atago Co., Ltd.), and a sodium lamp ($\lambda$=589 nm) is used as a light source. In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley & Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

A transparent film according to the embodiment of the present invention includes: a support; a dot array that is formed on one surface of the support and in which dots obtained by immobilizing a cholesteric liquid crystalline phase are two-dimensionally arranged; and an overcoat layer that covers the dot array and is laminated on the support. In the dot array, the dots are formed randomly (irregularly) as described below.

In addition, a transparent screen according to the embodiment of the present invention is formed of the transparent film according to the embodiment of the present invention. An image display system according to the embodiment of the present invention includes: the transparent screen according to the embodiment of the present invention; and a projector. Further, a transparent poster according to the embodiment of the present invention includes the transparent screen according to the embodiment of the present invention, in which the dots in the dot array are formed in an image shape, that is, the dots are formed corresponding to any design.

FIG. 1 conceptually shows an example of the transparent screen according to the embodiment of the present invention including the transparent film according to the embodiment of the present invention. In addition, FIG. 2 conceptually shows an example of the image display system according to the embodiment of the present invention including the transparent screen.

Figure 2:
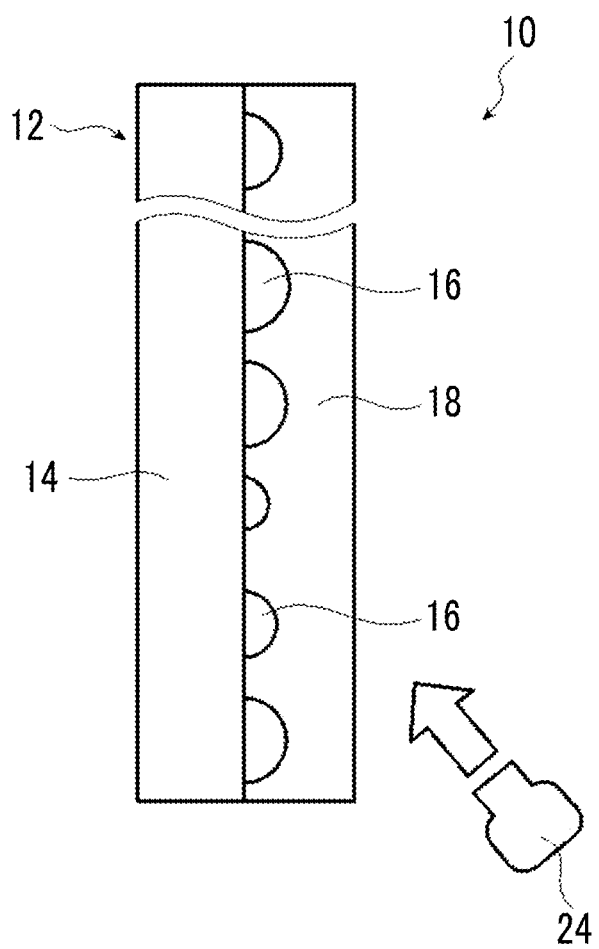
FIG. 2 is a diagram conceptually showing an image display system according to an embodiment of the present invention including the transparent screen shown in FIG. 1.

FIG. 1 is a conceptual diagram (front view) showing a transparent screen 12 according to the embodiment of the present invention in case of being seen from the front surface. FIG. 2 is a conceptual diagram showing the transparent screen 12 in case of being seen from a side surface, that is, from a direction perpendicular to the front surface (plane direction of the transparent screen 12). The transparent screen 12 according to the embodiment of the present invention being seen from the front surface represent a case where the transparent screen according to the embodiment of the present invention is seen from a normal direction perpendicular to a support 14 (direction perpendicular to the support 14).

In the example shown in FIGS. 1 and 2, the transparent screen 12 includes: the support 14; dots 16 that constitute a dot array and are two-dimensionally arranged on one main surface of the support 14; and an overcoat layer 18 that covers the dots 16 (array of the dots 16) and is laminated on the support 14. In order to clearly show the configuration of the present invention, in FIG. 1, the overcoat layer 18 that forms a surface of the transparent screen 12 (surface opposite to the support 14) is not shown.

The image display system 10 shown in FIG. 2 includes: the transparent screen 12; and a projector 24. In the image display system 10, projection light carrying an image that is irradiated from the projector 24 is reflected from the transparent screen 12 (the dots 16 described below). As a result, an image is displayed on the transparent screen 12.

Here, the image display system 10 is a system that displays a green monochromic image. Accordingly, the transparent screen 12 reflects green light, and the projector 24 projects a green monochromic image to the transparent screen 12.

The transparent screen 12 shown in FIG. 1 includes the support 14, the dots 16, and the overcoat layer 18.

<Support>

The support 14 of the transparent screen 12 supports dots obtained by immobilizing a cholesteric liquid crystalline phase described below.

It is preferable that the reflectivity of the support 14 is low at a wavelength where the dots reflect light, and it is preferable that the support 14 does not include a material which reflects light at a wavelength where the dots reflect light.

In addition, it is preferable that the support 14 is transparent in a visible range. In addition, the support 14 may be colored. However, it is preferable that the support is not colored or the area of the support colored is small. Further, the refractive index of the support 14 is preferably about 1.2 to 2.0 and more preferably about 1.4 to 1.8.

"Transparent" described in this specification represents that the non-polarized light transmittance (total transmittance) at a wavelength of 380 to 780 nm is preferably 50% or higher, more preferably 70% or higher, and still more preferably 85% or higher.

In addition, a haze value of the support 14 is preferably 30% or lower, more preferably 0.1% to 25%, and still more preferably 0.1% to 10%. Further, by using the support 14 having a high haze such as an antiglare (AG) support, the haze value can be adjusted such that transparency deteriorates and front brightness and viewing angle characteristics are improved.

The thickness of the support 14 may be selected depending on the application without any particular limitation, and is preferably about 5 to 1000 μm, more preferably 10 to 250 μm, and still more preferably 15 to 150 μm.

The support 14 may have a single-layer structure or a multi-layer structure. In a case where the support 14 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 14 has a multi-layer structure, examples thereof include a support including: one of the above-described supports having a single-layer structure that is provided as a substrate; and another layer that is provided on a surface of the substrate.

An underlayer may be provided between the support 14 and the dots. The underlayer is preferably a resin layer and more preferably a transparent resin layer. Examples of the underlayer include a layer for adjusting the shape of the dot during the formation of the dot, a layer for improving adhesion properties between the support 14 and the dots, and an aligned film for adjusting the alignment of a polymerizable liquid crystal compound during the formation of the dot.

In addition, it is preferable that the reflectivity of the underlayer is low at a wavelength where the dots reflect light, and it is preferable that the underlayer does not include a material which reflects light at a wavelength where the dots reflect light. In addition, it is preferable that the underlayer is transparent. Further, the refractive index of the underlayer is preferably about 1.2 to 2.0 and more preferably about 1.4 to 1.8. It is also preferable that the underlayer is a layer including a resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 μm and more preferably 0.05 to 20 μm.

<Dot>

In the transparent screen 12, the dots 16 are, for example, dots (reflecting dots) that reflect green right circularly polarized light and allow transmission of the other light components.

In the transparent screen according to the present invention, the dots are not limited to the dots 16 that reflect green right circularly polarized light and allow transmission of the other light components. That is, the dots included in the transparent screen (transparent film) according to the embodiment of the present invention may be dots that reflect blue right circularly polarized light and allow transmission of the other light components, or dots that reflect red right circularly polarized light and allow transmission of the other light components. Alternatively, the dots may be dots that reflect blue left circularly polarized light and allow transmission of the other light components, dots that reflect green left circularly polarized light and allow transmission of the other light components, or dots that reflect red left circularly polarized light and allow transmission of the other light components.

The following description of the dots 16 is common to all the dots.

In addition, the transparent screen (transparent film) according to the embodiment of the present invention may include: a dot array of dots that reflect blue right circularly polarized light and allow transmission of the other light components; a dot array of dots that reflect green right circularly polarized light and allow transmission of the other light components; and a dot array of dots that reflect red right circularly polarized light and allow transmission of the other light components.

Alternatively, the transparent screen according to the present invention may include: a dot array of dots that reflect blue left circularly polarized light and allow transmission of the other light components; a dot array of dots that reflect green left circularly polarized light and allow transmission of the other light components; a dot array of dots that reflect red left circularly polarized light and allow transmission of the other light components.

This configuration will be described below in detail.

In the present invention, the dots that reflect any color or the dots that reflect any circularly polarized light are dots obtained by immobilizing a cholesteric liquid crystalline phase. That is, the dots are dots formed of a liquid crystal material having a cholesteric structure.

Here, the cholesteric liquid crystalline phase forming each of the dots has a stripe pattern including bright portions and dark portions in a cross-section of the dot in case of being observed with a scanning electron microscope. The dot includes a portion having a height which continuously increases to a maximum height in a direction moving from an end portion of the dot to the center of the dot. In this portion, an angle between a normal line perpendicular to a line, which is formed using a first dark portion from a surface of the dot opposite to the support 14, and the surface of the dot is preferably in a range of 70° to 90°.

This point will be described below.

Here, the arrangement density of the dots 16 in the transparent screen 12 is not particularly limited, and may be appropriately set according to the diffusibility (viewing angle), transparency, and the like required for the transparent screen 12 as long as it satisfies the random (irregular) arrangement condition described below.

For example, from the viewpoint of obtaining high transparency to obtain a wide viewing angle at which a hot spot can be suppressed and the viewpoint of obtaining an appropriate density or the like at which the dots can be manufactured without defects such as coalescence or deletion of the dots during manufacturing, in case of being seen from a normal direction perpendicular to a main surface of the support 14, an area ratio of the dots with respect to the support 14 is preferably 1% to 90.6%, more preferably 2% to 50%, and still more preferably 4% to 30%.

The area ratio of the dots may be obtained by obtaining an image using a microscope such as a laser microscope, a scanning electron microscope (SEM) or a transmission electron microscope (TEM), measuring area ratios in a region having a size of 1×1 mm, and obtaining an average value of area ratios at, for example, five positions.

In this specification, the description of the dot is applicable to all the dots in the transparent film according to the present invention. Further, it is allowable that the transparent film according to the present invention including the above-described dots also includes a dot which deviates from the above description due to an error which is allowable in the technical field.

It is preferable that the dots 16 are circular in case of being observed from the normal direction perpendicular to a main surface of the support 14. For example, the dots 16 are dots having a shape such as a hemispherical shape (substantially hemispherical shape), a spherical segment shape (substantially spherical segment shape), a spherical trapezoidal shape, a conical shape, or a truncated cone shape. In the following description, the normal direction perpendicular to the main surface of the support 14 will also be referred to as "support normal direction".

The circular shape is not necessarily a perfect circle and may be a substantially circular shape. The center of the dot 16 described herein refers to the center of the circle or the center of gravity. The dots are not particularly limited as long as the average shape of the dots is circular, and may include some dots having a shape other than a circular shape.

<<Optical Characteristics of Dot>>

In the transparent screen (transparent film) according to the embodiment of the present invention, the dots have wavelength selective reflecting properties. Specifically, the dots 16 shown in the drawing reflect green light. However, the present invention is not limited to this configuration. The dots may reflect red light or blue light.

Basically, the transparent screen 12 according to the embodiment of the present invention is used as a screen that can observe an image which is formed by image light emitted from the projector 24 and scenery on a back surface side of the transparent screen 12 in an overlapping manner. It is preferable that light where the dots exhibit selective reflecting properties is visible light. Alternatively, the reflection wavelength of the dots may be selected according to a wavelength of light emitted from the projector 24.

As described above, the dots 16 are dots obtained by immobilizing a cholesteric liquid crystalline phase.

The wavelength of light where the dots 16 exhibit selective reflecting properties can be adjusted (selected) by adjusting a helical pitch in the cholesteric liquid crystalline phase which forms the dots.

In addition, in the cholesteric liquid crystalline phase which forms the dots 16 in the transparent screen according to the embodiment of the present invention, a helical axis direction is adjusted as described below. Therefore, light incident on the dots 16 includes not only specularly reflected light but also light reflected in various directions.

In addition, the dots 16 may be colored. However, it is preferable that the dots 16 are not colored or the area of the dots 16 colored is small. As a result, the transparency of the transparent screen can be improved.

<<Cholesteric Liquid Crystalline Phase>>

It is known that the cholesteric liquid crystalline phase exhibits selective reflecting properties at a specific wavelength. A center wavelength λ of the selective reflection depends on a pitch P (=helical cycle) of a helical structure in the cholesteric liquid crystalline phase and complies with an average refractive index n of the cholesteric liquid crystalline phase and a relationship of $\lambda = n \times P$. Therefore, the selective reflection wavelength (selective reflection center wavelength) of the dots 16 can be adjusted by adjusting the pitch of the helical structure. The pitch of the cholesteric liquid crystalline phase depends on the kind of a chiral agent which is used in combination of a polymerizable liquid crystal compound during the formation of the dot 16, or the concentration of the chiral agent added. Therefore, a desired pitch can be obtained by adjusting the kind and concentration of the chiral agent.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase has a stripe pattern including bright portions and dark portions in a cross-sectional view of the dot in case of being observed with a scanning electron microscope. Two bright portions and two dark portions in the repeated bright portions and dark portion correspond to one helical pitch. Based on the above fact, the pitch can be measured from the SEM cross-sectional view. In the dot, a normal line perpendicular to each line of the stripe pattern is the helical axis direction of the cholesteric liquid crystalline phase.

Reflected light of the cholesteric liquid crystalline phase is circularly polarized light. That is, in the transparent screen 12 according to the embodiment of the present invention, the dots 16 reflect right circularly polarized light. Whether or not the reflected light is right circularly polarized light or left circularly polarized light is determined depending on a helical twisting direction of the cholesteric liquid crystalline phase. Regarding the selective reflection of the circularly polarized light by the cholesteric liquid crystalline phase, in a case where the helical twisting direction of the cholesteric liquid crystalline phase is right, right circularly polarized light is reflected, and in a case where the helical twisting direction of the cholesteric liquid crystalline phase is left, left circularly polarized light is reflected.

In the transparent screen 12 shown in the drawing, for example, the dots 16 reflect right circularly polarized light. Therefore, the dots 16 are dots obtained by immobilizing a right-twisted cholesteric liquid crystal phase.

A direction of rotation of the cholesteric liquid crystalline phase can be adjusted by adjusting a kind of a liquid crystal compound for forming the dots 16 and a kind of a chiral agent to be added.

In addition, a full width at half maximum $\Delta\lambda$ ($nm$) of a selective reflection range (circularly polarized light reflection range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection range can be controlled by adjusting $\Delta n$. $\Delta n$ can be adjusted by adjusting a kind of a liquid crystal compound for forming the dots (the right circularly polarized light reflecting layer and the left circularly polarized light reflecting layer) and a mixing ratio thereof, and a temperature during alignment immobilization. The full width at half maximum of the reflection wavelength range is adjusted depending on the application of the transparent screen 12 and is, for example, 50 to 500 nm and preferably 100 to 300 nm.

The dot 16 obtained by immobilizing a cholesteric liquid crystalline phase has a stripe pattern including bright portions and dark portions in a cross-sectional thereof. In a case where the cross-sectional view of the dot 16 obtained by immobilizing a cholesteric liquid crystalline phase is observed with a scanning electron microscope, an angle between a normal line perpendicular to a line, which is formed using a first dark portion from a surface of the dot 16 opposite to the support 14, and the surface of the dot 16 opposite to the support 14 is preferably in a range of 70° to 90°.

In the following description, "the surface of the dot opposite to the support 14" will also simply referred to as "the surface of the dot".

Figure 3:
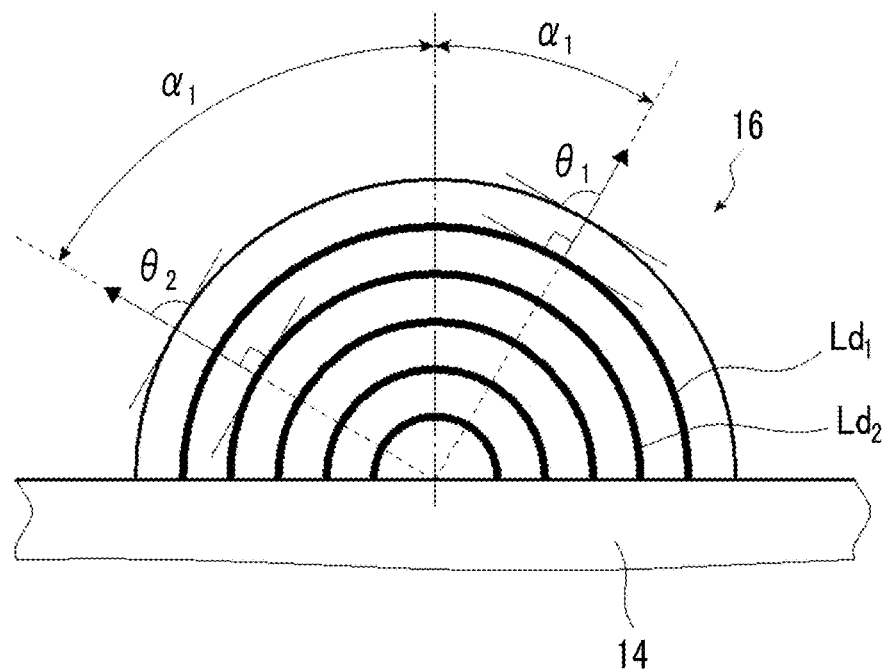
FIG. 3 is a conceptual diagram showing a dot of the transparent screen shown in FIG. 1.

FIG. 3 is a schematic diagram showing a cross-section of the dot 16. In FIG. 3, lines which are formed using the dark portions are indicated by thick lines. As shown in FIG. 3, an angle $\theta_1$ between a normal line (broken line) perpendicular to a line $Ld_1$, which is formed using the first dark portion, and the surface of the dot 16 is preferably 70° to 90°.

Here, in a case where a position of the surface of the dot 16 is represented by an angle $\alpha_1$ with respect to a line (chain line) perpendicular to the surface of the support 14 which passes through the center of the dot 16, it is preferable that, at a position where the angle $\alpha_1$ is 30° and a position where the angle $\alpha_1$ is 60°, the angle between the normal line perpendicular to the line $Ld_1$, which is formed using the first dark portion from the surface of the dot 16, and the surface of the dot 16 is preferably in a range of 70° to 90°, and it is more preferable that, at all the positions of the surface of the dot 16, the angle between the normal line perpendicular to the line $Ld_1$, which is formed using the first dark portion from the surface of the dot 16, and the surface of the dot 16 is preferably in a range of 70° to 90°.

That is, it is preferable that the angle satisfies the above-described range at some positions of the surface of the dot 16. For example, it is preferable that the angle satisfies the above-described range not intermittently but continuously at some positions of the surface of the dot 16. In a case where the surface of the dot 16 is curved in a cross-sectional view, the angle between the normal line perpendicular to the line, which forms the dark portion, and the surface of the dot 16 refers to an angle between a tangent line of the surface of the dot 16 and the normal line. In addition, the angle between the normal line and the surface of the dot 16 is expressed by an acute angle and is in a range of 70° to 110° in case of being expressed by an angle of 0° to 180°.

In a cross-sectional view of the dot 16, it is preferable that an angle $\theta_2$ between a normal line perpendicular to a line $Ld_2$, which is formed using a second dark portion from the surface of the dot 16, and the surface of the dot 16 is preferably in a range of 70° to 90°, it is more preferable that an angle $\theta$ between a normal line perpendicular to each of lines, which are formed using third and fourth dark portions from the surface of the dot 16, and the surface of the dot 16 is preferably in a range of 70° to 90°, and it is still more preferable that an angle $\theta$ between a normal line perpendicular to each of lines, which are formed using fifth to twelfth or more dark portions from the surface of the dot 16, and the surface of the dot 16 is preferably in a range of 70° to 90°.

Further, the angle between the normal line perpendicular to the line, which is formed using the dark portion, and the surface of the dot 16 is more preferably 80° to 90° and still more preferably 85° to 90°.

The cross-sectional view of the dot 16 observed with a SEM shows that an angle between the helical axis of the cholesteric liquid crystalline phase and the surface of the dot 16 (or a tangent line thereof) is in a range of 70° to 90°.

Due to the above-described structure, light incident on the dot 16 in a direction with an angle from a normal direction perpendicular to the support 14 can be made to be incident at an angle, which is substantially parallel to the helical axis direction of the cholesteric liquid crystalline phase, on the surface of the dot 16. Therefore, light which is incident on the dot 16 can be reflected in various directions.

In addition, the dot 16 specularly reflects incidence light with respect to the helical axis of the cholesteric liquid crystalline phase. Therefore, as conceptually shown in FIG. 4, light In is incident from the normal direction perpendicular to the support 14, whereas reflected light Ir reflected from the vicinity of the center of the dot 16 is reflected parallel to the normal direction perpendicular to the support. On the other hand, at a position which deviates from the center of the dot 16 (a position where the helical axis of the cholesteric liquid crystalline phase is inclined with respect to the normal direction perpendicular to the support 14), the reflected light Ir is reflected in a direction different from the normal direction perpendicular to the support 14. Accordingly, light which is incident on the dot 16 can be reflected in various directions, and the viewing angle can be widened. In addition, light Ip which is transmitted through the dot 16 is transmitted in the same direction as that of the light In. Therefore, the scattering of the transmitted light can be suppressed to reduce the haze, and the transparency can be improved.

In addition, it is preferable that light incident from the normal direction perpendicular to the support 14 can be reflected in all the directions. In particular, it is preferable that an angle (half power angle) in which the brightness is half of the front brightness (peak brightness) can be made to be 35° or more and that high reflecting properties are exhibited.

It is preferable that, by making the helical axis of the cholesteric liquid crystalline phase to form an angle of 70° to 90° with the surface of the dot 16, an angle between a normal direction perpendicular to a line, which is formed using a first dark portion from the surface, and a normal direction perpendicular to the support continuously decreases along with a continuous increase in the height.

The cross-sectional view is a cross-sectional view of a surface in any direction including a portion having a height which continuously increases to a maximum height in a direction moving from an end portion of the dot 16 to the center of the dot 16. Typically, the cross-sectional view may be a cross-sectional view of any surface which includes the center of the dot 16 and is perpendicular to the support.

<<Method of Preparing Dots>>

The dots 16 can be obtained by immobilizing a cholesteric liquid crystalline phase in a dot shape.

The structure in which a cholesteric liquid crystalline phase is immobilized may be a structure in which the alignment of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the aligned state is not changed by an external field or an external force.

The structure in which a cholesteric liquid crystalline phase is immobilized is not particularly limited as long as the optical characteristics of the cholesteric liquid crystalline phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the dots obtained by immobilizing a cholesteric liquid crystalline phase include a liquid crystal composition including a liquid crystal compound. It is preferable that the liquid crystal compound is a polymerizable liquid crystal compound.

It is preferable that the liquid crystal composition including a liquid crystal compound for forming the dots 16 further includes a surfactant. In addition, the liquid crystal composition used for forming the dots 16 may further include a chiral agent and a polymerization initiator.

- -Polymerizable Liquid Crystal Compound- -

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

Specific examples of the polymerizable liquid crystal compound include compounds represented by the following Formulae (1) to (11).

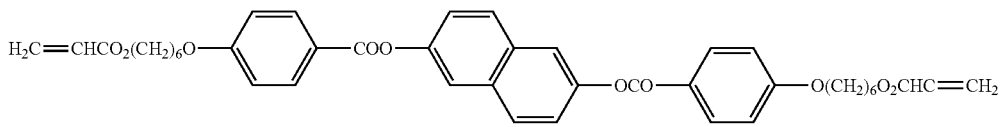
(1)

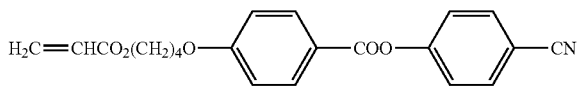
(2)

(3)

(4)

(5)

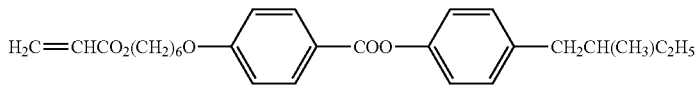
(6)

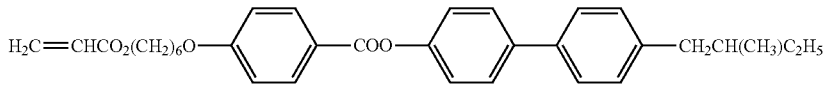
(7)

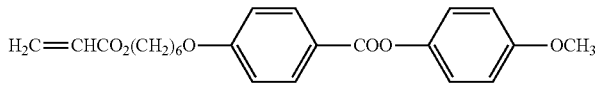
(8)

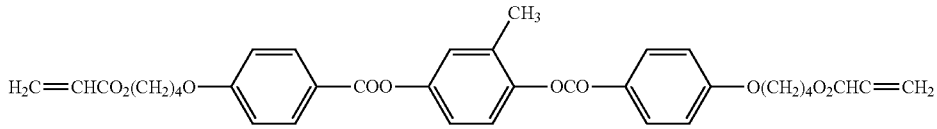
(9)

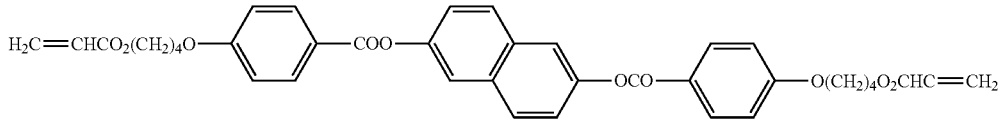
(10)

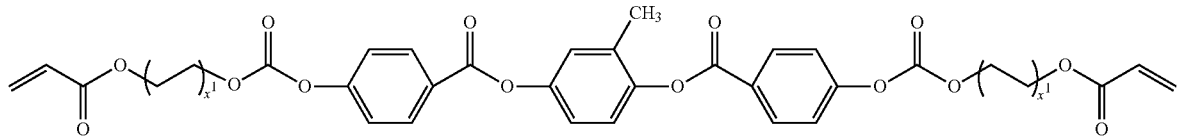
(11)

[In Compound (11), $X^1$ represents 2 to 5 (integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

- -Surfactant- -

The present inventors found that, by adding the surfactant to the liquid crystal composition during the formation of the dot 16, the polymerizable liquid crystal compound is aligned to be parallel to an air interface side, and the helical axis direction of the dot 16 is controlled as described above.

In general, in order to form the dot 16 obtained by immobilizing a cholesteric liquid crystalline phase, it is necessary that the surface tension is not decreased to maintain a liquid droplet shape during printing. Therefore, it is surprising that a dot 16 can be formed even after the addition of the surfactant and that the dot 16 exhibits high retroreflection properties in multiple directions. According to the investigation of the present inventors, in a case where the surfactant is used, a dot 16 is formed such that an angle between the surface of the dot 16 and the support 14 in an end portion of the dot 16 is 40° or higher. That is, by adding the surfactant during the formation of the dot 16, the contact angle between the dot 16 and the support 14 can be formed in an angle range where a wide viewing angle and high transparency can be simultaneously realized.

It is preferable that the surfactant is a compound which can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As a horizontal alignment agent, one kind may be used alone, or two or more kinds may be used in combination.

As the fluorine surfactant, a compound represented by the following Formula (I) described in paragraphs "0082" to "0090" of JP2014-119605A is preferable.

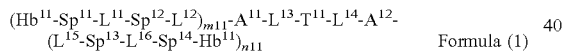

Formula (1)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of the dot. From this viewpoint, —O—, —S—, —CO—, —COO—, —OCO—, —COS— or —SCO— is more preferable. From the viewpoint of the stability of the compound, —O—, —CO—, —COO—, or —OCO— is more preferable. The alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ or $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of T described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be aligned even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent heterocyclic group preferably represented by any one of the following formulae (X in $T_{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms),

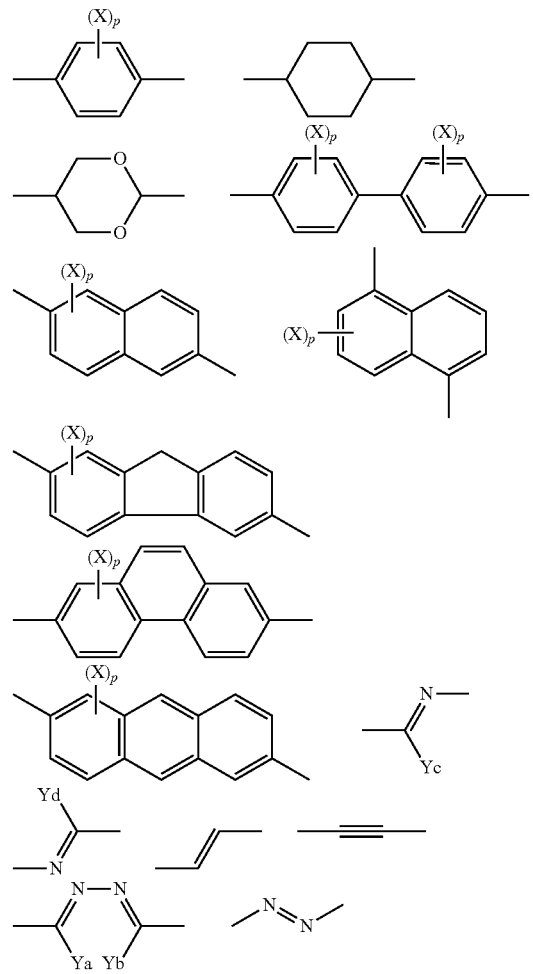

more preferably represented by any one of the following formulae,

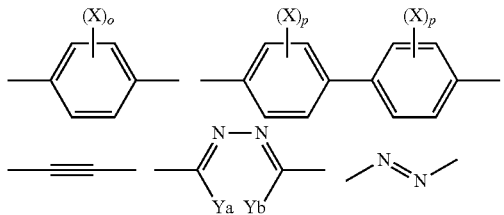

still more preferably represented by any one of the following formulae.

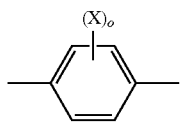

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable. The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by R′ COO—. R′ represents, for example, an alkyl group having 1 to 8 carbon atoms. The description and preferable range of the alkyl group represented by R′ can be found in the description and preferable range of the alkyl group represented by X in $T^{11}$. Specific examples of the ester include $CH_3COO$— and $C_2H_5COO$—. The alkyl group having 1 to 4 carbon atoms represented by Ya, Yb, Yc, or Yd may be linear or branched. Examples of the alkyl group having 1 to 4 carbon atoms include a methyl group, an ethyl group, an n-propyl group, and an isopropyl group.

It is preferable that the divalent heterocyclic group has a 5-membered, 6-membered, or 7-membered heterocycle. A 5-membered or 6-membered heterocycle is more preferable, and a 6-membered heterocycle is most preferable. As a heteroatom constituting the heterocycle, a nitrogen atom, an oxygen atom, or a sulfur atom is preferable. It is preferable that the heterocyclic group is an aromatic heterocyclic group. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^{11}$ and $A^{12}$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, or rotational symmetry.

The compound represented by Formula (I) is a combination of the perfluoroalkyl group ($Hb^{11}$), the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$-)$_{n11}$, and preferably the divalent group having an excluded volume effect which is represented by T. Two perfluoroalkyl groups ($Hb^{11}$) present in the molecule are preferably the same as each other, and the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$)$_{n11}$- present in the molecule are also preferably the same as each other. $Hb^{11}$-$Sp^{11}$-$L^{11}$-$Sp^{12}$ and -$Sp^{13}$-$L^{16}$-$Sp^{14}$-$Hb^{11}$ present at the terminal are preferably a group represented by any one of the following formulae:

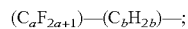

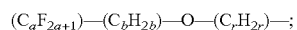

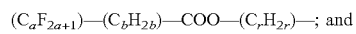 and

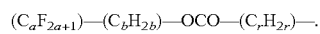

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}$-$Sp^{11}$-$L^{11}$-$Sp^{12}$-$L^{12}$- and $L^{15}$-$Sp^{13}$-$L^{16}$-$Sp^{14}$-$Hb^{11}$ present at the terminal of Formula (I) are preferably a group represented by any one of the following formulae:

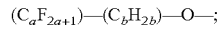

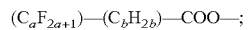

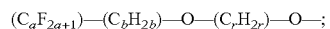

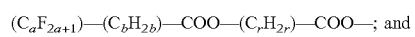 and

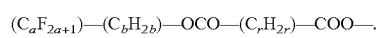

In the above formulae, a, b, and r have the same definitions as described above.

The addition amount of the surfactant in the liquid crystal composition is preferably 0.01 to 10 mass %, more preferably 0.01 to 5 mass %, and still more preferably 0.02 to 1 mass % with respect to the total mass of the polymerizable liquid crystal compound.

compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

(12)

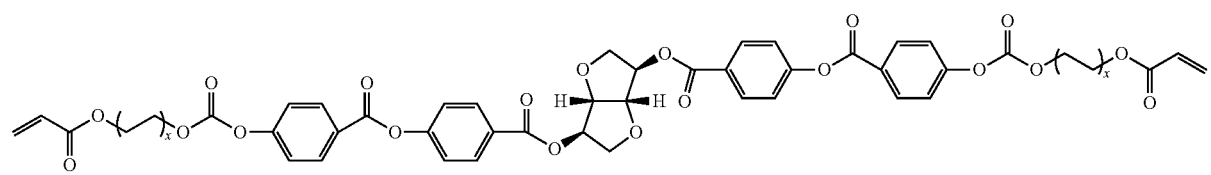

- -Chiral Agent (Optically Active Compound)- -

The chiral agent has a function of causing a helical structure of a cholesteric liquid crystalline phase to be formed. The chiral agent may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and alignment, which is preferable. As the photoisomerization group, an isomerization portion of a photochromic compound, an azo group, an azoxy group, or a cinnamoyl group is preferable. Specific examples of the In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

- -Polymerization Initiator- -

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the polymerizable liquid crystal compound.

- -Crosslinking Agent- -

In order to improve the film hardness after curing and to improve durability, the liquid crystal composition may include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

- -Other Additives- -

In a case where an ink jet method described below is used for forming the dot, the liquid crystal composition may include a monofunctional polymerizable monomer in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, a ultraviolet absorber, a light stabilizer, a colorant, metal oxide particles or the like can be added to the liquid crystal composition in a range where optical performance and the like do not deteriorate.

It is preferable that the liquid crystal composition is used as a liquid during the formation of the dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden. The above-described component such as the above-described monofunctional polymerizable monomer may function as the solvent.

The liquid crystal composition is applied to the support 14 in a dot shape and then is cured to form a dot 16.

During the formation of the dot 16, the application of the liquid crystal composition to the support 14 may be performed using a well-known method, and examples of the well-known method include an ink jet method (jetting of a liquid crystal composition) and a printing method. The printing method is not particularly limited, and examples thereof include a gravure printing method, a flexographic printing method, and a screen printing method. Among these, an ink jet method is preferable from the viewpoint that a dot 16 having a random dot area and/or a random inter-dot distance described below can be suitably formed by adjusting a jetting amount of an ink droplet and/or a jetting position of an ink droplet. The random formation of the dot 16 using a printing method can be performed using a well-known printing technique.

The liquid crystal composition applied to the support 14 is optionally dried or heated and then is cured to form the dot. In the drying and/or heating step, the polymerizable liquid crystal compound in the liquid crystal composition only has to be aligned. In the case of heating, the heating temperature is preferably 200° C. or lower and more preferably 130° C. or lower.

The aligned liquid crystal compound may be further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 to 50 J/cm$^2$ and more preferably 100 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an infrared (IR) absorption spectrum.

As described above, in the transparent screen 12 according to the embodiment of the present invention, projection light projected from the projector 24 is reflected by the dots 16 to display an image.

Here, in the transparent screen 12 according to the embodiment of the present invention, an area of the dot 16 and/or a distance between one dot 16 and another 16 that is most adjacent to the dot 16 is random (irregular). According to the present invention, with the above-described configuration, in a case where scenery (the opposite side of the transparent screen) is observed through the transparent screen 12 in a state where an image is not displayed (in a state where an image is not projected), the scenery can be appropriately observed without color unevenness.

Figure 23:
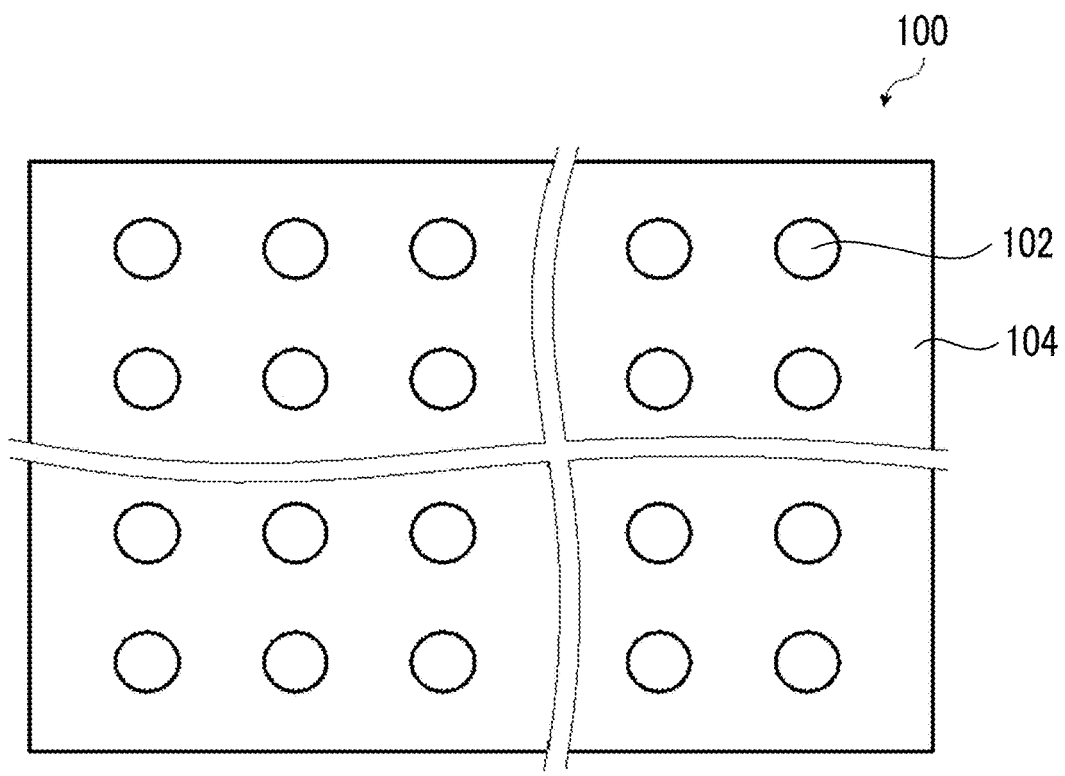
FIG. 23 is a conceptual diagram showing the transparent screen of the related art.

In a transparent screen in which an image projected from a projector is reflected from dots formed on a transparent screen to display the image, typically, in order to appropriately display the image, as in the case of a transparent screen 100 shown in FIG. 23, dots 102 are formed on a support 104 in a state where areas of the dots 102 (sizes of the dots 102) are uniform and the dots 102 are arranged in a regular shape such as a lattice shape.

However, according to the investigation by the present inventors, in the transparent screen in which the dots that reflect light are formed by immobilizing a cholesteric liquid crystalline phase, in a case where scenery is observed through the transparent screen in a state where an image is not displayed, light having transmitted through the transparent screen is converted into diffracted light by the dots. As a result, color unevenness (brightness unevenness) occurs in the observed scenery, and the scenery cannot be appropriately observed. In particular, in a case where a light source such as a fluorescent lamp or an electric lamp is present on the scenery side, color unevenness in which light emitted from the light source scatters significantly occurs (refer to the lower column of FIG. 21).

In addition, the color unevenness of the transmitted light caused by dots significantly occurs particularly in a case where each of the dots 16 has a stripe pattern including bright portions and dark portions in a cross-section and an angle $\theta_1$ between a normal line (broken line) perpendicular to the line $Ld_1$, which is formed using the first dark portion from the surface, and the surface of the dot 16 is preferably 70° to 90° as shown in FIG. 3.

The color unevenness of scenery occurring in a case where light having transmitted through the transparent screen is converted into diffracted light by the dots 16 is a phenomenon that is different from well-known color unevenness of the related art such as moire caused by the arrangement of the dots, color unevenness of the dots, the support, or the like, color unevenness caused by a variation in in-plane reflectivity of the transparent screen, or color unevenness caused by wavelength dependence of scattering. This phenomenon is a new finding unique to the transparent screen (transparent film) in which light is reflected from the dots obtained by immobilizing a cholesteric liquid crystal to display an image.

In order to solve this problem, the present inventors conducted a thorough investigation. As a result, it was found that the color unevenness of scenery occurring in a case where light having transmitted through the transparent screen is converted into diffracted light by the dots 16 can be significantly reduced by forming the dots 16 of the transparent screen randomly instead of forming the dots 16 regularly, that is, by making the areas (dot areas) of the dots 16 and the distance (inter-dot distance) between one dot 16 and another dot 16 that is most adjacent to the dot 16 non-uniform to some extent.

Specifically, in the transparent screen 12 according to the present invention, in a case where, in a cumulative distribution diagram in which the horizontal axis represents an area of the dots 16 and the vertical axis represents a cumulative distribution (cumulative number (cumulative frequency) (%)) of the dots 16, an area of the dots 16 corresponding to a cumulative distribution (cumulative frequency) of 50% is represented by Xs, an area of the dots 16 corresponding to a cumulative distribution of 5% is represented by Ysa, and an area of the dots 16 corresponding to a cumulative distribution of 95% is represented by Ysb, and in a case where, in a cumulative distribution diagram in which the horizontal axis represents an inter-dot distance as a distance between one dot 16 and another dot 16 that is most adjacent to the dot 16, an inter-dot distance corresponding to a cumulative distribution of 50% is represented by Xd, an inter-dot distance corresponding to a cumulative distribution of 5% is represented by Yda, and an inter-dot distance corresponding to a cumulative distribution of 95% is represented by Ydb, the dots 16 (the arrangement of the dots) satisfy at least one of the following Expression (1), (2), (3), or (4), $Xs \times 0.85 > Ysa$   Expression (1), $Xs \times 1.15 < Ysb$   Expression (2), $Xd \times 0.85 > Yda$   Expression (3), and $Xd \times 1.15 < Ydb$   Expression (4).

In other words, a condition that the dot area Ysa corresponding to a cumulative distribution of 5% is not within −15% of the dot area Xs corresponding to a cumulative distribution of 50% in the cumulative distribution diagram in which the horizontal axis represents the area of the dots 16 is set as a dot area condition 1, a condition that the dot area Ysb corresponding to a cumulative distribution of 95% is not within +15% of the dot area Xs corresponding to a cumulative distribution of 50% in the cumulative distribution diagram in which the horizontal axis represents the area of the dots 16 is set as a dot area condition 2, a condition that the inter-dot distance Yda corresponding to a cumulative distribution of 5% is not within −15% of the inter-dot distance Xd corresponding to a cumulative distribution of 50% in the cumulative distribution diagram in which the horizontal axis represents the inter-dot distance between one dot 16 and another dot 16 that is most adjacent to the dot 16 is set as an inter-dot distance condition 1, and a condition that the inter-dot distance Ydb corresponding to a cumulative distribution of 95% is not within +15% of the inter-dot distance Xd corresponding to a cumulative distribution of 50% in the cumulative distribution diagram in which the horizontal axis represents the inter-dot distance between one dot 16 and another dot 16 that is most adjacent to the dot 16 is set as an inter-dot distance condition 2.

In this case, the transparent screen 12 according to the embodiment of the present invention satisfies at least one of the dot area condition 1, the dot area condition 2, the inter-dot distance condition 1, or the inter-dot distance condition 2.

In the present invention, the area of the dots 16 refers to the area of the dots 16 at a position in contact with the support 14, that is, the area of the dots 16 at an interface between the dots 16 and the support 14, that is, the area of the dots in case of being observed from the support normal direction.

In addition, in the present invention, the inter-dot distance refers to a dot-inter-center distance between the center of one dot 16 and the center of another dot 16 that is most adjacent to the dot 16 at a contact position between the dots 16 and the support 14 (an interface between the dots 16 and the support 14; in case of being seen from the support normal direction), for example, an inter-dot distance $Yd_1$ of a dot 16-1 or an inter-dot distance $Yd_2$ of a dot 16-2 in FIG. 1. That is, in a case where the dots 16 are circular, a distance between the center of one circle and the center of another circle is the inter-dot distance. In a case where the dots 16 are not circular, as conceptually shown in FIG. 5, an inscribed circle C of each of the dots 16 may be set, and a center O of the circle C may be set as the center of the dot 16.

More specifically, in a transparent screen (reflecting laminate) according to Example 1 described below, in a cumulative distribution diagram shown in FIG. 6 in which the horizontal axis represents the area of the dots 16, the dot area Xs corresponding to a cumulative distribution of 50% is 420 μm². Therefore, Xs×0.85 is 357 μm², and Xs×1.15 is 483 μm² (±15% of the dot area Xs is 357 to 483 μm²). In this cumulative distribution diagram, the dot area Ysa corresponding to a cumulative distribution of 5% is 295 μm², and the dot area Ysb corresponding to a cumulative distribution of 95% is 1450 μm². Therefore, this transparent screen satisfies both Expressions (1) and (2).

On the other hand, in a transparent screen (reflecting laminate) according to Comparative Example 1 described below, in a cumulative distribution diagram shown in FIG. 7 in which the horizontal axis represents the area of the dots 16, the dot area Xs corresponding to a cumulative distribution of 50% is 900 μm². Therefore, Xs×0.85 is 765 μm², and Xs×1.15 is 1035 μm² (±15% of the dot area Xs is 765 to 1035 μm²). In this cumulative distribution diagram, the dot area Ysa corresponding to a cumulative distribution of 5% is 850 μm², and the dot area Ysb corresponding to a cumulative distribution of 95% is 940 μm². Therefore, this transparent screen does not satisfy both Expressions (1) and (2).

Figure 8:
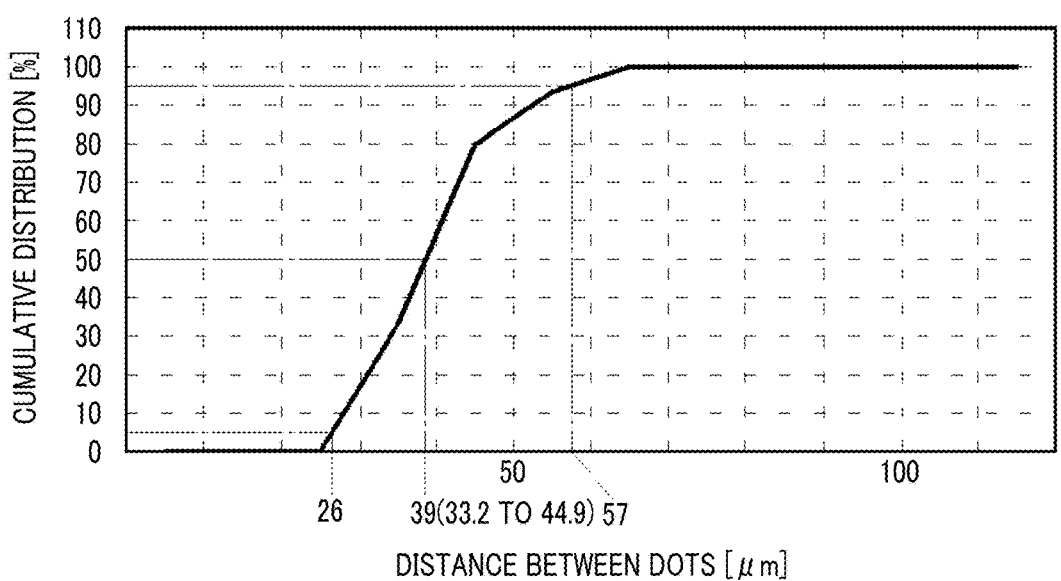
FIG. 8 is a cumulative distribution diagram of an inter-dot distance of the transparent screen according to the embodiment of the present invention.

Likewise, in the transparent screen (reflecting laminate) according to Example 1, in a cumulative distribution diagram shown in FIG. 8 in which the horizontal axis represents the inter-dot distance, the inter-dot distance Xd corresponding to a cumulative distribution of 50% is 39 μm. Therefore, Xd×0.85 is 33.2 μm, and Xd×1.15 is 44.9 μm (±15% of the inter-dot distance Xd is 33.2 to 44.9 μm). In this cumulative distribution diagram, the inter-dot distance Yda corresponding to a cumulative distribution of 5% is 26 µm, and the inter-dot distance Ydb corresponding to a cumulative distribution of 95% is 57 µm. Therefore, this transparent screen satisfies both Expressions (3) and (4).

Figure 9:
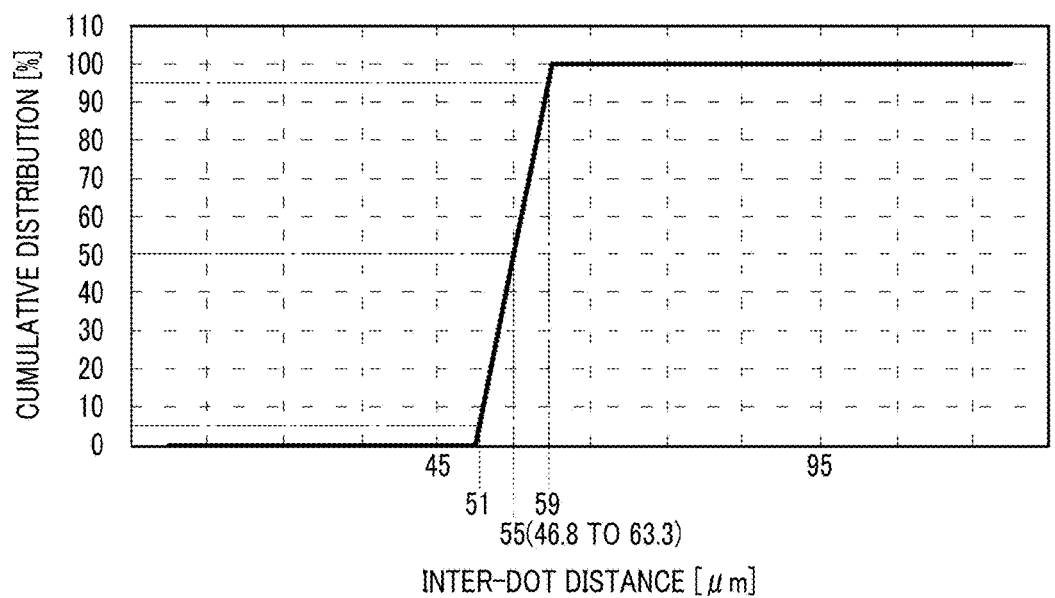
FIG. 9 is a cumulative distribution diagram of an inter-dot distance of the transparent screen of the related art.

On the other hand, in the transparent screen (reflecting laminate) according to Comparative Example 1, in a cumulative distribution diagram shown in FIG. 9 in which the horizontal axis represents the inter-dot distance, the inter-dot distance Xd corresponding to a cumulative distribution of 50% is 55 µm. Therefore, Xd×0.85 is 46.8 µm, and Xd×1.15 is 63.3 µm (±15% of the inter-dot distance Xd is 46.8 to 63.3 µm). Here, in this cumulative distribution diagram, the inter-dot distance Yda corresponding to a cumulative distribution of 5% is 51 µm, and the inter-dot distance Ydb corresponding to a cumulative distribution of 95% is 59 µm. Therefore, this transparent screen does not satisfy both Expressions (3) and (4).

According to the present invention, with the above-described configuration, the color unevenness of the scenery occurring in a case where light having transmitted through the transparent screen is converted into diffracted light by the dots 16 can be significantly reduced. In addition, even in a case where a light source is present on the scenery side in a state where an image is not displayed on the transparent screen, scenery can be appropriately observed without color unevenness caused by the dots 16.

In the transparent screen 12 according to the embodiment of the present invention, the dots 16 (dot array) may satisfy at least one of Expression (1), (2), (3), or (4). It is preferable that the dots 16 satisfy at least one of Expression (3) or (4) relating to the inter-dot distance, it is more preferable that the dots 16 satisfy both Expression (3) and (4) relating to the inter-dot distance, and it is still more preferable that the dots 16 satisfy all the Expressions (1) to (4).

In the transparent screen 12 according to the embodiment of the present invention, whether or not the dot area and the inter-dot distance satisfy each of Expressions (1) to (4) may be determined by imaging a region including 50 or more dots 16 in one image using an optical microscope, a laser microscope, a scanning electron microscope (SEM), a transmission electron microscope (TEM), and the like and measuring dot areas and inter-dot distances of 20 or more randomly selected dots to create the cumulative distribution diagram in which the horizontal axis represents the dot area and the cumulative distribution diagram in which the horizontal axis represents the inter-dot distance.

It is preferable that the number of dots used for measuring the dot area and the inter-dot distance is as large as possible. In addition, optionally, a plurality of regions including 50 or more dots 16 that do not overlap with each other may be imaged to create the cumulative distribution diagram in which the horizontal axis represents the dot area and the cumulative distribution diagram in which the horizontal axis represents the inter-dot distance using a plurality of micrographs.

In the transparent screen 12 according to the embodiment of the present invention, an average inter-dot distance is preferably 10 to 100 µm and more preferably 20 to 80 µm.

In the transparent screen 12 according to the embodiment of the present invention, an average diameter of the dots 16 is preferably 10 to 100 µm and more preferably 20 to 80 µm.

Likewise, the diameter of the dot 16 can be obtained by measuring the length of a line, which ranges from an end portion (an edge or a boundary of the dot 16) to another end portion and passes through the center of the dot 16, in an image obtained using a microscope such as a laser microscope, a scanning electron microscope, or a transmission electron microscope.

Figure 5:
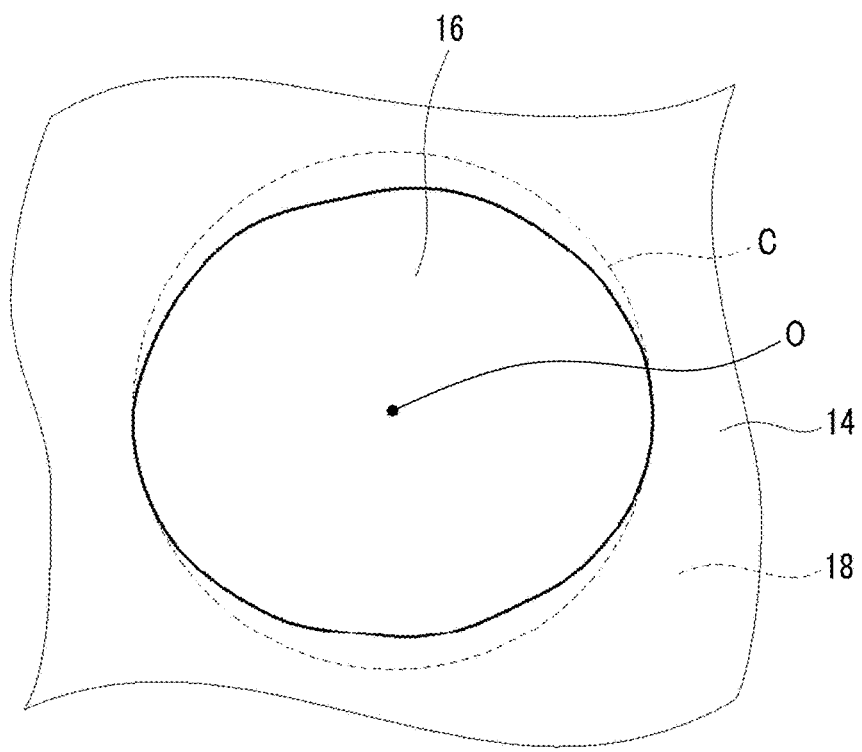
FIG. 5 is a conceptual diagram showing the dot of the transparent screen shown in FIG. 1.

In a case where the dot has a shape other than a circular shape in case of being seen from the support normal direction, as in the case of the center of the dot 16, as conceptually shown in FIG. 5, an inscribed circle C of the dot 16 is set and the diameter of the circle C is obtained as the diameter of the dot. The shape of the dot in case of being seen from the support normal direction refers to the shape of the dot at the interface between the dot 16 and the support 14.

The average diameter may be obtained by randomly selecting 20 dots in the image used for measuring the dot area and the inter-dot distance, measuring diameters of the 20 dots using the above-described method, and obtaining the average value thereof.

The height of the dot 16 can be obtained from a cross-sectional view of the dot 16 which is obtained by focal position scanning using a laser microscope or obtained using a microscope such as a SEM or a TEM.

The average maximum height of the dots 16 is preferably 5 to 30 µm, more preferably 8 to 25 µm, and still more preferably 10 to 20 µm.

<Overcoat Layer>

The transparent screen 12 includes the overcoat layer 18 that embeds the dots 16 and is laminated on the support 14.

The overcoat layer 18 is not particularly limited as long as it is provided on the surface of the support 14 where the dots 16 are formed, and it is preferable that the surface of the transparent screen 12 is smoothened.

The refractive index of the overcoat layer 18 is not particularly limited, and it is preferable that a difference between the refractive index of the dot 16 and the refractive index of the overcoat layer 18 is as low as possible. Specifically, the difference between the average refractive index of the dot 16 and the refractive index of the overcoat layer 18 is preferably 0.1 or lower and more preferably 0.04 or lower. Since the refractive index of the dot 16 is about 1.6, it is preferable that the overcoat layer 18 is a resin layer having a refractive index of about 1.5 to 1.7.

In the following description, the difference between the average refractive index of the dots 16 and the refractive index of the overcoat layer 18 will also be referred to as "the difference in refractive index between the dots 16 and the overcoat layer 18".

By adjusting the difference in refractive index between the dots 16 and the overcoat layer 18 to be 0.1 or lower, the effect of the random dots 16 suppressing the color unevenness of scenery in a state where an image is not displayed can be increased, and the haze of the transparent screen 12 can also be reduced.

Further, by using the overcoat layer 18 having a refractive index similar to the refractive index of the dot 16, the angle (polar angle) of light incident on the dot from the normal line can be reduced. For example, in a case where the overcoat layer 18 having a refractive index of 1.6 is used and light is incident on the transparent screen 12 at a polar angle of 45°, a polar angle at which light is actually incident on the dot can be made to be about 27°. Therefore, by using the overcoat layer 18, the polar angle of light at which the transparent screen 12 exhibits retroreflection properties can be widened, and high retroreflection properties can be obtained at a wider angle even in a case where the angle between the surface of the dot and the support 14 is small. In addition, the overcoat layer 18 may function as an antireflection layer or a hard coat layer.

Examples of the overcoat layer 18 include a resin layer which is obtained by applying a composition including a monomer to the surface of the support 14 where the dots are formed, and curing the coating film.

A resin used for the overcoat layer 18 is not particularly limited and may be selected in consideration of the adhesiveness between the support 14 and the dots 16 or the like. For example, a thermoplastic resin, a thermosetting resin, or an ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer 18 include ethyl (meth) acrylate, ethylhexyl (meth)acrylate, styrene, methylstyrene, N-vinylpyrrolidone, polymethylol propane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth) acrylate.

The thickness of the overcoat layer 18 may be selected depending on the maximum height of the dot without any particular limitation, and may be about 5 to 100 μm and is preferably 10 to 50 μm and more preferably 20 to 40 μm. The thickness is the distance from a surface of the support, where the dots are formed, to a surface of the overcoat layer provided on a surface of the support, where the dots are not formed, which is opposite to the surface where the dots are formed.

The image display system 10 shown in FIG. 2 includes: the transparent screen 12 in which the dots 16 are randomly formed; and the projector 24.

In the image display system 10 shown in FIG. 2, the projector 24 is a projector that projects a green monochromic image.

The projector 24 is a well-known projector that displays an image on the transparent screen 12 by optionally performing keystone correction (distortion correction) and projecting projection light that carries the image to the transparent screen 12.

Accordingly, as the projector, various projectors such as a digital light processing (DLP) projector, a liquid crystal on silicon (LCOS) projector, or a laser projector can be used.

In the image display system 10 according to the embodiment of the present invention, the projector 24 is preferably a so-called short focal length projector having a short focal length.

In addition, in the image display system 10 according to the embodiment of the present invention, it is preferable that convex sides of the dots 16 of the transparent screen 12 are disposed to face the projector 24 side, and it is preferable that the image display system 10 is a so-called front projection type in which an image is observed on the projector 24 side.

Further, in the image display system 10 according to the embodiment of the present invention, it is preferable that the projector 24 is disposed such that an incidence angle of outgoing light from the projector 24 is 25° to 75° and preferably 40° to 70° with respect to a normal line perpendicular to the transparent screen 12.

As described above, the transparent screen 12 according to the embodiment of the present invention reflects light using the dots obtained by immobilizing a cholesteric liquid crystalline phase, and an angle between a helical axis of the cholesteric liquid crystalline phase and the surface of the dot is preferably in a range of 70° to 90° as shown in FIG. 2. As a result, as shown in FIG. 3, the transparent screen 12 can reflect light incident on the dots not only by retroreflection but also in various directions on the light incidence side.

Therefore, in the image display system 10 according to the embodiment of the present invention, an image can be suitably recognized at a wide viewing angle not only in a case where light is projected from the normal direction perpendicular to the transparent screen but also in a case where light is projected at a large angle with respect to a normal line perpendicular to a transparent screen in a projector disposed below the transparent screen, for example, in a short focal length projector.

Accordingly, the image display system 10 according to the embodiment of the present invention is a front projection type, and the incidence angle of the projector 24 with respect to the normal line perpendicular to the transparent screen 12 is 25° to 75°. As a result, the projector 24 can be disposed near the transparent screen such that the image display system can be minimized. Further, since the image display system 10 is a front projection type, an optical path from the projector 24 to an observer can be made to be a folded optical path using the transparent screen. Therefore, a space for securing a required optical path length can be reduced, and the image display system can be further minimized.

The above-described points are also applicable to an image display system 30 shown in FIG. 10 described below.

Hereinafter, the action of the image display system 10 shown in FIG. 2 will be described.

Once the projector 24 is driven, green projection light carrying an image that is emitted from the projector 24 is incident on the transparent screen 12 and transmits through the overcoat layer 18.

As described above, the dots 16 are reflecting dots that reflect green right circularly polarized light. Accordingly, green right circularly polarized light incident on the dots 16 is reflected from the dots 16 such that a green monochromic image is displayed (projected) on the transparent screen 12.

In addition, light incident on a region other than the dots 16 or light other than green right circularly polarized light can transmit through the transparent screen 12. Therefore, in a case where a green monochromic image emitted from the projector 24 is displayed, scenery can also be observed through the transparent screen 12.

In a case where the emission of projection light from the projector 24 is stopped, no image is displayed on the transparent screen 12 and only scenery is observed through the transparent screen 12.

Here, in the transparent screen 12 according to the embodiment of the present invention, as described above, the dots 16 are formed in a random state where they satisfy at least one of Expression (1), (2), (3), or (4).

Accordingly, even in a case where a fluorescent lamp or the like is present opposite to the transparent screen 12 with respect to an observer, the color unevenness of scenery occurring in a case where light having transmitted through the transparent screen is converted into diffracted light by the dots 16 can be significantly reduced. Therefore, the observer can appropriately observe scenery through the transparent screen 12 without color unevenness.

Figure 10:
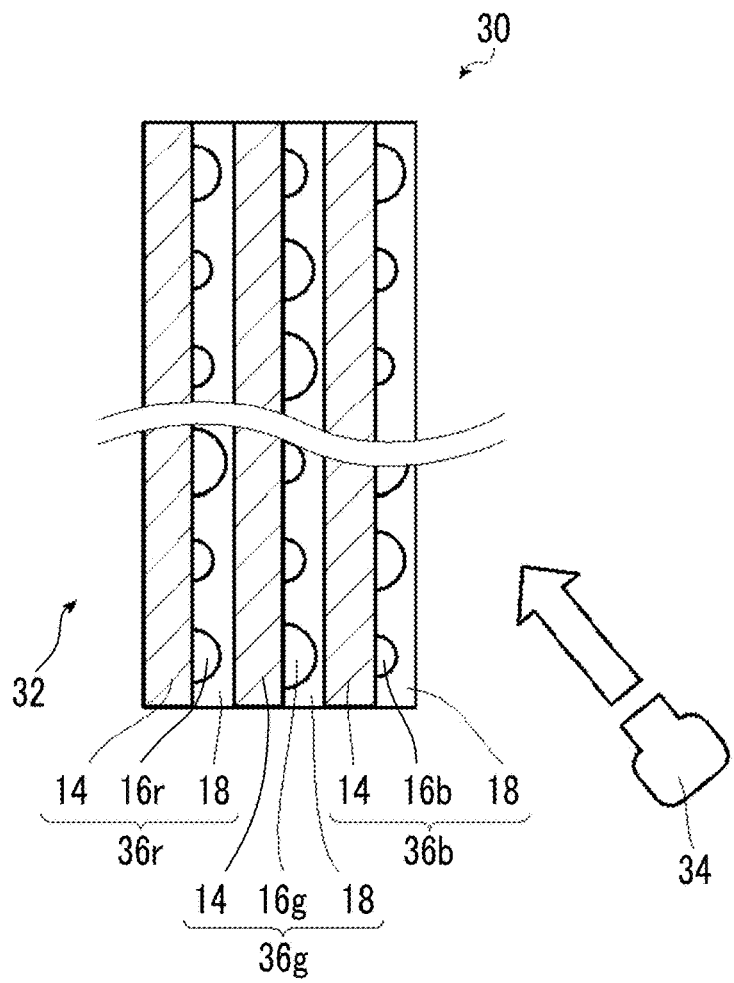
FIG. 10 is a diagram conceptually showing another example of the image display system according to the embodiment of the present invention.

FIG. 10 conceptually shows another example of the image display system according to the embodiment of the present invention including another example of the transparent screen according to the embodiment of the present invention.

The image display system 10 shown in FIG. 2 displays a green monochromatic image. However, the image display system 30 shown in FIG. 10 is a system that displays a color image.

The image display system 30 includes a transparent screen 32 according to the embodiment of the present invention and a projector 34.

The transparent screen 32 includes a blue reflecting laminate 36b, a green reflecting laminate 36g, and a red reflecting laminate 36r.

In the transparent screen 32 shown in FIG. 10, a large number of members are the same as those of the transparent screen 12. Therefore, the same members are represented by the same reference numerals, and different members will be mainly described below. In addition, in order to clearly show the configuration of the transparent screen 32, the support 14 is indicated by oblique lines in FIG. 10.

The blue reflecting laminate 36b and the green reflecting laminate 36g, and the green reflecting laminate 36g and the red reflecting laminate 36r are bonded using bonding layers (not shown), respectively.

In the present invention, as the bonding layer, any bonding layer formed of one of well-known various materials can be used as long as it is a material that can bond a plate-shaped material (sheet-like material) as a target. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-like material in an optical device or an optical element, for example, an optical clear adhesive (OCA), an optically transparent double-sided tape, or an ultraviolet curable resin.

Alternatively, instead of bonding the layers using the bonding layers, the blue reflecting laminate 36b, the green reflecting laminate 36g, and the red reflecting laminate 36r may be laminated and held by a frame, a holding device, or the like to configure the transparent screen according to the embodiment of the present invention. Alternatively, the respective reflecting laminates may be bonded by making the overcoat layer 18 function as a bonding layer.

The blue reflecting laminate 36b includes: the support 14; blue reflecting dots 16b that are two-dimensionally arranged on one surface of the support 14; and the overcoat layer 18 that covers the blue reflecting dots 16b (array of the blue reflecting dots 16b) and is laminated on the support 14.

The blue reflecting dots 16b are dots that reflect blue right circularly polarized light and allow transmission of the other light components. The blue reflecting dots 16b are dots obtained by immobilizing a cholesteric liquid crystalline phase as described above regarding the dots 16.

In addition, the blue reflecting dots 16b are formed so as to satisfy at least one of Expression (1), (2), (3), or (4) as in the case of the dots 16.

The green reflecting laminate 36g includes: the support 14; green reflecting dots 16g that are two-dimensionally arranged on one surface of the support 14; and the overcoat layer 18 that covers the green reflecting dots 16g (array of the green reflecting dots 16g) and is laminated on the support 14.

The green reflecting dots 16g are the same as the dots 16 obtained by immobilizing a cholesteric liquid crystalline phase that reflect green right circularly polarized light and allow transmission of the other light components. That is, the green reflecting laminate 36g is the same as the transparent screen 12 shown in FIG. 1.

The red reflecting laminate 36r includes: the support 14; red reflecting dots 16r that are two-dimensionally arranged on one surface of the support 14; and the overcoat layer 18 that covers the red reflecting dots 16r (array of the red reflecting dots 16r) and is laminated on the support 14.

The red reflecting dots 16r are dots that reflect red right circularly polarized light and allow transmission of the other light components. The red reflecting dots 16r are dots obtained by immobilizing a cholesteric liquid crystalline phase as described above regarding the dots 16.

In addition, the red reflecting dots 16r are formed so as to satisfy at least one of Expression (1), (2), (3), or (4) as in the case of the dots 16.

The projector 34 is a well-known projector that is the same as the projector 24, except that color projection light is emitted.

Hereinafter, the action of the image display system 30 will be described.

Once the projector 34 is driven, projection light carrying an image that is emitted from the projector 34 is incident on the blue reflecting laminate 36b first.

In the blue reflecting laminate 36b, among light components having transmitted through the overcoat layer 18, only blue right circularly polarized light incident on the blue reflecting dots 16b is reflected, and the other light components transmit through the blue reflecting dots 16b and are incident on the green reflecting laminate 36g. In addition, in the blue reflecting laminate 36b, light incident on a region other than the blue reflecting dots 16b transmits through the blue reflecting laminate 36b and is incident on the green reflecting laminate 36g.

Among light components that are incident on the green reflecting laminate 36g and have transmitted through the overcoat layer 18, only green right circularly polarized light incident on the green reflecting dots 16g is reflected, and the other light components transmit through the green reflecting dots 16g and are incident on the red reflecting laminate 36r. In addition, in the green reflecting laminate 36g, light incident on a region other than the green reflecting dots 16g transmits through the green reflecting laminate 36g and is incident on the red reflecting laminate 36r.

Among light components that are incident on the red reflecting laminate 36r and have transmitted through the overcoat layer 18, only red right circularly polarized light incident on the red reflecting dots 16r is reflected, and the other light components transmit through the red reflecting dots 16r and are incident on the transparent screen 32. In addition, in the red reflecting laminate 36r, light incident on a region other than the red reflecting dots 16r also transmits through the red reflecting laminate 36r and is incident on the transparent screen 32.

A color image is displayed on the transparent screen 32 by blue light reflected from the blue reflecting dots 16b, green light reflected from the green reflecting dots 16g, and red light reflected from the red reflecting dots 16r.

In addition, light incident on a region other than the respective reflecting dots, left circularly polarized light, and light at a wavelength at which light is not reflected from the respective reflecting dots can transmit through the transparent screen 32. Therefore, in a case where a color image emitted from the projector 34 is displayed, scenery can also be observed through the transparent screen 32.

In a case where the emission of projection light from the projector 34 is stopped, no image is displayed on the transparent screen 32 and only scenery is observed through the transparent screen 32.

Here, in the transparent screen 32 according to the embodiment of the present invention, as described above, the blue reflecting dots 16*b* of the blue reflecting laminate 36*b*, the green reflecting dots 16*g* of the green reflecting laminate 36*g*, and the red reflecting dots 16*r* of the red reflecting laminate 36*r* are formed in a state where they satisfy at least one of Expression (1), (2), (3), or (4).

Accordingly, even in a case where a fluorescent lamp or the like is present opposite to the transparent screen 12 with respect to an observer, the color unevenness of scenery occurring in a case where light having transmitted through the transparent screen is converted into diffracted light by the blue reflecting dots 16*b*, the green reflecting dots 16*g*, and the red reflecting dots 16*r* can be significantly reduced. Therefore, the observer can appropriately observe scenery through the transparent screen 32 without color unevenness.

The reflecting dots of each of the laminates of the transparent screen shown in FIG. 10 reflect right circularly polarized light and allow transmission of the other light components. However, the present invention is not limited to this configuration, and a color image may be displayed using the laminates including the reflecting dots that reflect left circularly polarized light.

In the example shown in FIG. 10, a color image may be displayed by laminating the three layers including the layer including blue reflecting dots 16*b*, the layer including the green reflecting dots 16*g*, and the layer including the red reflecting dots 16*r*. However, the present invention is not limited to this configuration.

For example, as shown in FIGS. 1 and 2, a color image may be displayed by forming a one-layer dot array that includes the green reflecting dots 16*g* and the red reflecting dots 16*r*.

In the above-described example, the transparent film according to the embodiment of the present invention is used in a transparent screen for displaying a projection image projected from the projector. However, the transparent film according to the embodiment of the present invention is not limited to this configuration and can be used for various applications.

For example, the dots that are obtained by immobilizing a cholesteric liquid crystalline phase and reflect right circularly polarized light or left circularly polarized light are formed in an image shape, that is, in a dot pattern corresponding to an image (design) and/or characters to be displayed in a state where they satisfy at least one of Expression (1), (2), (3), or (4). As a result, a transparent poster that is typically transparent and can display an image by light irradiation in a state where scenery can be observed, can be obtained.

Figure 11:
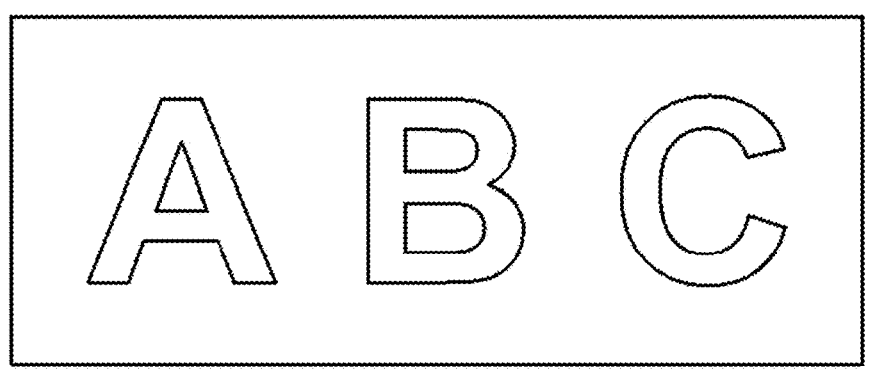
FIG. 11 is a conceptual diagram showing a transparent poster according to the embodiment of the present invention.

For example, as shown in FIG. 11, dots are formed at positions of a design including A, B, and C. As a result, a transparent poster that is typically transparent and reflects light using the dots during light irradiation to display A, B, and C can be prepared.

This transparent poster can display any characters or image (design) depending on formation positions of the dots.

In addition, at this time, a color image (color transparent poster) may be prepared by forming different dot patterns depending on colors and laminating supports (laminates) on which the dots of the respective colors are formed as in the case of the transparent screen 32 shown in FIG. 10.

Alternatively, a color image may be formed by forming a one-layer dot array including different dot patterns depending on colors.

This way, in a case where light is irradiated, characters or an image is seen, and in a case where light is not irradiated, the transparent poster is transparent. Therefore, a dramatic presentation using augmented reality can be simply realized.

This transparent poster can be prepared by drawing dots, for example, using an ink jet method. Accordingly, the dots having an image shape may be formed using an ink jet method or a printing method as described above. In particular, an ink jet method is suitably used due to the above-described reasons.

In addition, light emitted to the transparent poster may be light emitted from a collimated light source or a diffuse light source. From the viewpoint of preventing a so-called hot spot, a diffuse light source is preferable.

Hereinabove, the transparent film, the transparent screen, the image display system, and the transparent poster according to the embodiment of the present invention have been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Underlayer>

Components shown below were stirred and dissolved in a container held at 25° C. to prepare an underlayer-forming solution.

(Underlayer-Forming Solution)

Mixture A of the following rod-shaped liquid crystal compounds: 100 parts by mass IRGACURE 819 (manufactured by BASF SE): 3 parts by mass The following compound A: 0.6 parts by mass Methyl ethyl ketone: 932.4 parts by mass Mixture A of the Following Rod-Shaped Liquid Crystal Compounds

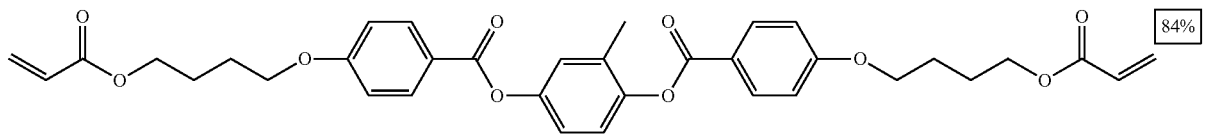

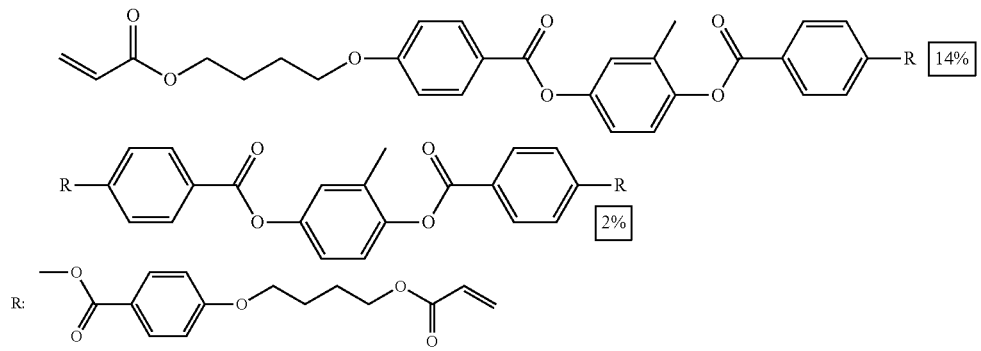

Numerical values are represented by mass %. In addition, R represents a group to be bonded to oxygen.

Compound A

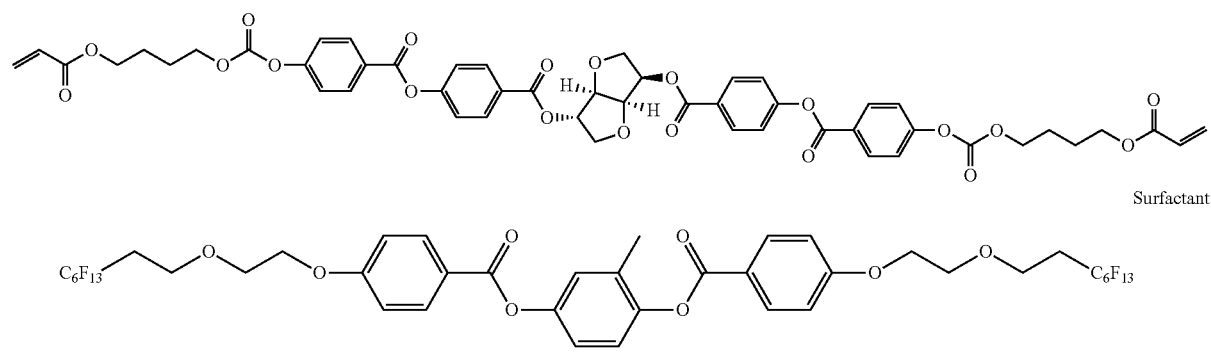

As the support 14, a transparent PET film (COSMOSHINE A4100, manufactured by Toyobo Co., Ltd.) having a thickness of 75 μm that was rubbed in a longitudinal direction was prepared.

The prepared underlayer-forming solution was applied to the support 14 using a bar coater #2.6. Next, the coating film was heated such that the coating film surface temperature was 50° C., and then was dried for 60 seconds. Next, in a nitrogen purged atmosphere having an oxygen concentration of 100 ppm or lower, the coating film was irradiated with ultraviolet light at 500 mJ/cm² using an ultraviolet irradiation device to promote a crosslinking reaction. As a result, an underlayer was prepared.

The haze value of the support 14 on which the underlayer was formed was measured and was 0.8%.

<Preparation of Cholesteric Liquid Crystal Ink Solution gR>

Components shown below were stirred and dissolved in a container held at 25° C. to prepare a cholesteric liquid crystal ink solution gR (liquid crystal composition).

(Liquid Crystal Composition)
Cyclopentanone: 139.6 parts by mass
Mixture A of the rod-shaped liquid crystal compounds: 100 parts by mass
IRGACURE 907 (manufactured by BASF SE): 3.0 parts by mass
KAYACURE DETX (manufactured by Nippon Kayaku Co., Ltd.): 1 part by mass
The following chiral agent A: 5.78 parts by mass
The following surfactant: 0.08 parts by mass The cholesteric liquid crystal ink solution gR is a material for forming dots that reflect light having a center wavelength of 550 nm. In addition, the cholesteric liquid crystal ink solution gR is a material for forming dots that reflect right circularly polarized light. That is, the cholesteric liquid crystal ink solution gR is a material for forming the green reflecting dots 16g.

<Preparation of Cholesteric Liquid Crystal Ink Solution rR and Cholesteric Liquid Crystal Ink Solution bR>

A cholesteric liquid crystal ink solution rR was prepared under the same conditions as those of the cholesteric liquid crystal ink solution gR, except that the addition amount of the chiral agent A was changed to 4.7 parts by mass. In addition, a cholesteric liquid crystal ink solution bR was prepared under the same conditions as those of the cholesteric liquid crystal ink solution gR, except that the addition amount of the chiral agent A was changed to 7.02 parts by mass.

The cholesteric liquid crystal ink solution rR is a material for forming the red reflecting dots 16r that reflect right circularly polarized light having a center wavelength of 650 nm. In addition, the cholesteric liquid crystal ink solution bR is a material for forming the blue reflecting dots 16b that reflect right circularly polarized light having a center wavelength of 450 nm.

<Preparation of Green Reflecting Laminate 36g>

The prepared cholesteric liquid crystal ink solution gR was charged into an ink jet printer (JV400SUV, manufactured by Mimaki Engineering Co., Ltd.).

At this time, using a multidrop function included in the ink jet printer, the liquid amount per ink droplet was randomly adjusted in a range of 4 to 40 pl and the jetting frequency of the ink droplets was randomly adjusted and set so as to jet the ink droplets.

Under this setting, the cholesteric liquid crystal ink solution gR was jetted to the entire surface of the support 14 on which the underlayer was formed using the ink jet printer. As a result, the green reflecting dots 16g (array of the green reflecting dots) was formed.

<<Verification of Dot>>

Figure 4:
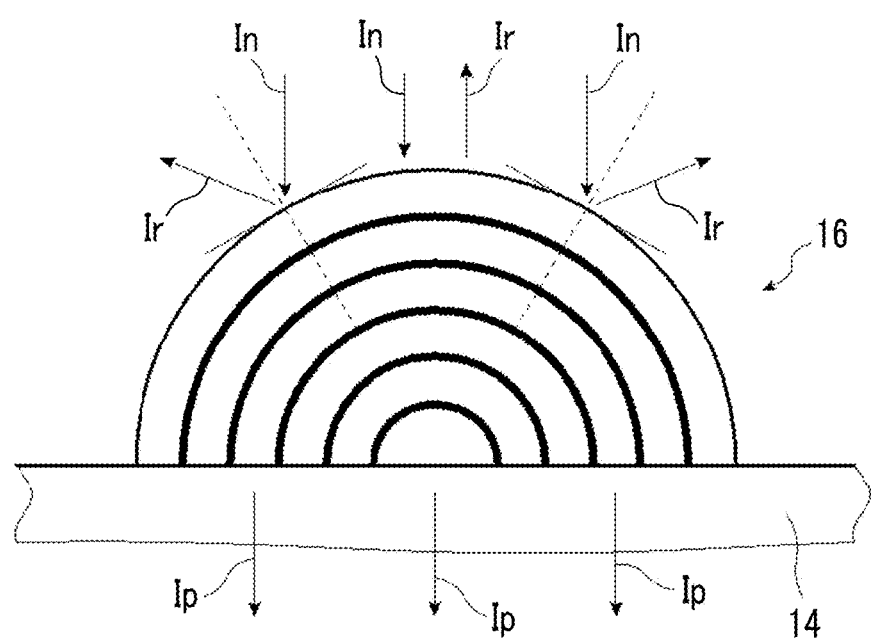
FIG. 4 is a conceptual diagram showing the dot of the transparent screen shown in FIG. 1.

Regarding one green reflecting dot 16g positioned at the center of the support 14 among the formed green reflecting dots 16g, a surface including the dot center was cut in a direction perpendicular to the support 14, and the obtained cross-section was observed using a scanning electron microscope. As a result, a stripe pattern including bright portions and dark portions was observed in the dot as shown in FIGS. 3 and 4.

Figure 12:
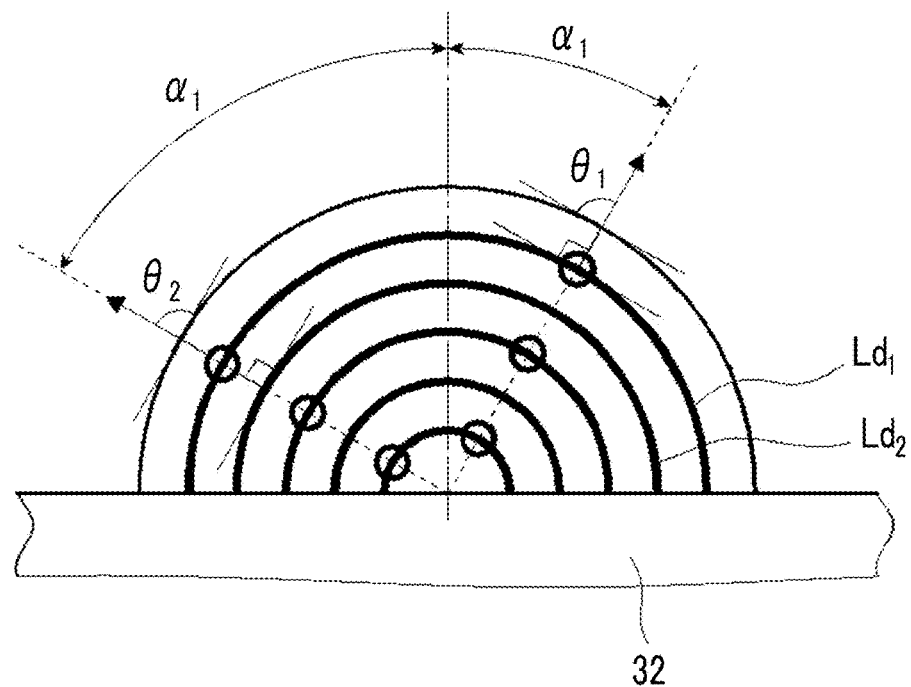
FIG. 12 is a conceptual diagram showing Example of the present invention.

Further, in the cross-sectional view, as shown in FIG. 3, at a position where the angle $\alpha_1$ was 30° and at a position where the angle $\alpha_1$ was 60°, the angles $\theta_1$ and $\theta_2$ between normal directions of lines, which were formed using dark portions of the dot, and the surface of the dot were measured, the angle $\alpha_1$ being an angle with respect to a line (chain line) perpendicular to the surface of the support 14 passing through the center of the dot. As conceptually shown in FIG. 12, the measurement was on the lines which were formed using three dark portions including: a line which was formed using the outermost dark portion of the dot (the line $Ld_1$ (dot end portion) which was formed using the first dark portion in FIG. 3); a line (dot center) which was formed using the innermost dark portion of the dot; and a line (between the dot end portion and the center) which was formed using a dark portion between the dot end portion and the dot center.

As a result, the angles measured at the dot end portion, at the portion between the dot end portion and the dot center, at the dot center were 90°, 89°, and 90°, respectively. That is, in the dot, the angles between the normal directions of the lines, which were formed using the dark portions of the dot, and the surface of the dot were substantially the same even at the vicinity of the surface of the dot, at the center (innermost portion) of the dot, and at the intermediate portion of the dot.

<Formation of Overcoat Layer 18>

Components shown below were stirred and dissolved in a container held at 25° C. to prepare an overcoat layer-forming coating solution 01.

(Overcoat Layer-Forming Coating Solution 01)

Methyl ethyl ketone: 103.6 parts by mass
KAYARAD DPCA-30 (manufactured by Nippon Kayaku Co., Ltd.): 50 parts by mass The following compound L: 50 parts by mass
The compound A: 0.6 parts by mass
IRGACURE 127 (manufactured by BASF SE): 3 parts by mass

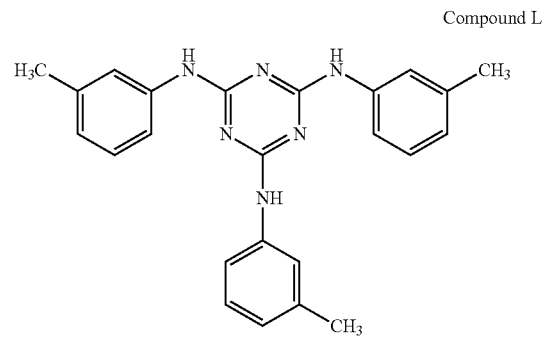

Compound L

The prepared overcoat layer-forming coating solution 01 was applied to the support 14 (underlayer) on which the green reflecting dots 16g were formed using a bar coater #8.

Next, the coating film was heated such that the coating film surface temperature was 50° C., and then was dried for 60 seconds. Next, the coating film was irradiated with ultraviolet light at 500 mJ/cm² using an ultraviolet irradiation device to promote a crosslinking reaction. As a result, the overcoat layer 18 was prepared, and the green reflecting laminate 36g was obtained.

<Preparation of Blue Reflecting Laminate 36b and Red Reflecting Laminate 36r>

The blue reflecting laminate 36b was prepared under the same conditions as those of the green reflecting laminate 36g, except that the cholesteric liquid crystal ink solution bR was used instead of the cholesteric liquid crystal ink solution gR.

In addition, the red reflecting laminate 36r was prepared under the same conditions as those of the green reflecting laminate 36g, except that the cholesteric liquid crystal ink solution rR was used instead of the cholesteric liquid crystal ink solution gR.

<<Measurement of Dot Area and Inter-Dot Distance>>

Figure 13:
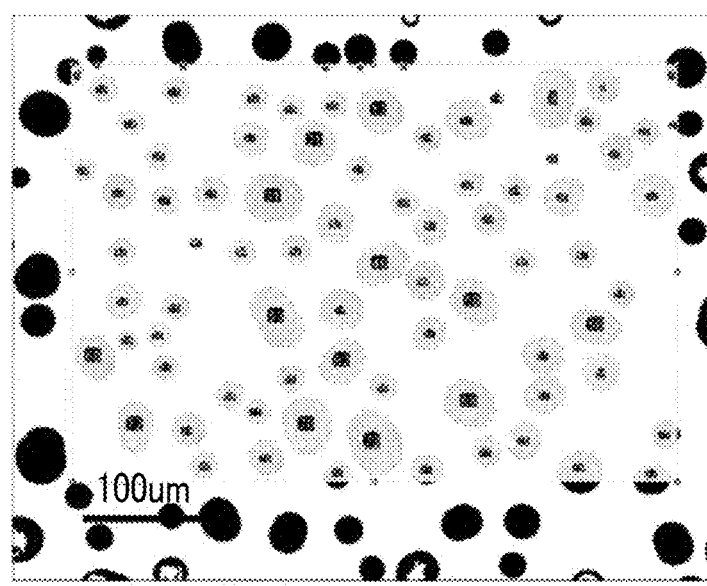
FIG. 13 is a diagram showing dots in Example of the transparent screen according to the embodiment of the present invention.

The prepared green reflecting laminate 36g, the prepared blue reflecting laminate 36b, and the prepared red reflecting laminate 36r were imaged using an optical microscope (ECLIPSE, manufactured by Nikon Corporation). The imaging was performed such that 60 or more reflecting dots were included. FIG. 13 shows a micrograph of the green reflecting laminate 36g.

60 or more reflecting dots were randomly selected from the obtained micrograph, areas of the selected respective reflecting dots were calculated, and the calculated areas were aligned in order from the smallest to the largest to create a cumulative distribution diagram in which the horizontal axis represents the area. In addition, 60 or more reflecting dots were randomly selected from the obtained micrograph, inter-dot distances of the selected respective reflecting dots and reflecting dots most adjacent to the respective reflecting dots were measured, and the measured inter-dot distances were aligned in order from the smallest to the largest to create a cumulative distribution diagram in which the horizontal axis represents the inter-dot distance.

The upper column of FIG. 14 shows the cumulative distribution diagram of the dot area, and the lower column of FIG. 14 shows the cumulative distribution diagram of the inter-dot distance. The cumulative distribution diagrams of the green reflecting laminate 36g, the blue reflecting laminate 36b, and the red reflecting laminate 36r are the same.

Figure 6:
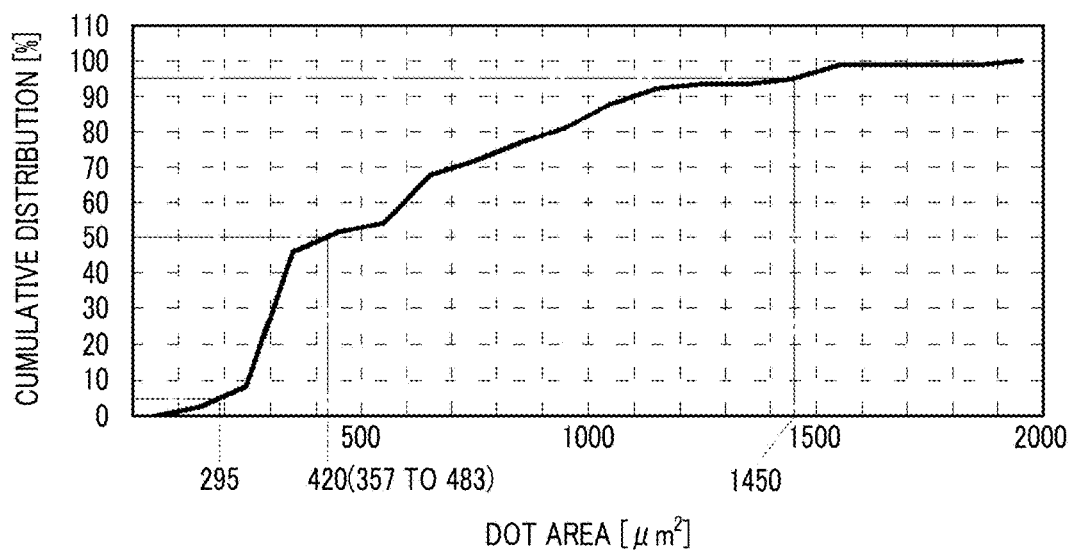
FIG. 6 is a cumulative distribution diagram showing a dot area of the transparent screen according to the embodiment of the present invention.

The upper column of FIG. 14 shows the cumulative distribution diagram of the dot area which is the same as the cumulative distribution diagram of the dot area shown in FIG. 6.

That is, the dot area Xs corresponding to a cumulative distribution of 50% was 420 $\mu m^2$, Xs×0.85 was 357 $\mu m^2$, and Xs×1.15 was 483 $\mu m^2$. In addition, the dot area Ysa corresponding to a cumulative distribution of 5% was 295 $\mu m^2$, and the dot area Ysb corresponding to a cumulative distribution of 95% was 1450 $\mu m^2$. Accordingly, this reflecting laminate satisfies both Expressions (1) and (2).

In addition, the cumulative distribution diagram of the inter-dot distance shown in the lower column of FIG. 14 is the same as the cumulative distribution diagram of the inter-dot distance shown in FIG. 8.

That is, the inter-dot distance Xd corresponding to a cumulative distribution of 50% was 39 $\mu m$. Therefore, Xd×0.85 was 33.2 $\mu m$, and Xd×1.15 was 44.9 $\mu m$. In addition, the inter-dot distance Yda corresponding to a cumulative distribution of 5% was 26 $\mu m$, and the inter-dot distance Ydb corresponding to a cumulative distribution of 95% was 57 $\mu m$. Accordingly, this reflecting laminate satisfies both Expressions (3) and (4).

In addition, using an Abbe refractometer (NAR-4T, manufactured by Atago Co., Ltd.), a difference in refractive index between the reflecting dots (average refractive index) and the overcoat layer 18 was measured. As a result, a difference in refractive index between the reflecting dots and the overcoat layer 18 was 0.09.

<Preparation of Transparent Screen 32>

The prepared green reflecting laminate 36g, the blue reflecting laminate 36b, and the red reflecting laminate 36r were laminated in order of the blue reflecting laminate 36b, the green reflecting laminate 36g, and the red reflecting laminate 36r, and were bonded using a pressure sensitive adhesive (SK DINE, manufactured by Soken Chemical & Engineering Co., Ltd.) to prepare a transparent screen shown in FIG. 10.

Example 2

An overcoat layer-forming coating solution 02 was prepared under the same conditions as those of the overcoat layer-forming coating solution 01 in Example 1, except that the amount of KAYARAD DPCA-30 (manufactured by Nippon Kayaku Co., Ltd.) was changed to 45 parts by mass and the amount of the compound L was changed to 55 parts by mass.

The green reflecting laminate 36g, the blue reflecting laminate 36b, and the red reflecting laminate 36r were prepared under the same conditions as those of Example 1, except that the overcoat layer-forming coating solution 02 was used instead of the overcoat layer-forming coating solution 01.

In a case where the dot area and the inter-dot distance were measured under the same conditions as those of Example 1, the obtained cumulative distribution diagrams of the dot area and the inter-dot distance were the same as those of Example 1. That is, the green reflecting laminate 36g, the blue reflecting laminate 36b, and the red reflecting laminate 36r satisfied Expression (1), (2), (3), or (4).

In addition, in a case where a difference in refractive index between the reflecting dots and the overcoat layer 18 was measured under the same conditions as those of Example, 1, the difference in refractive index was 0.04.

Next, a transparent screen was prepared under the same conditions as those of Example 1 using the green reflecting laminate 36g, the blue reflecting laminate 36b, and the red reflecting laminate 36r.

Example 3

An overcoat layer-forming coating solution 03 was prepared under the same conditions as those of the overcoat layer-forming coating solution 01 in Example 1, except that the amount of KAYARAD DPCA-30 (manufactured by Nippon Kayaku Co., Ltd.) was changed to 40 parts by mass and the amount of the compound L was changed to 60 parts by mass.

The green reflecting laminate 36g, the blue reflecting laminate 36b, and the red reflecting laminate 36r were prepared under the same conditions as those of Example 1, except that the overcoat layer-forming coating solution 03 was used instead of the overcoat layer-forming coating solution 01.

In a case where the dot area and the inter-dot distance were measured under the same conditions as those of Example 1, the obtained cumulative distribution diagrams of the dot area and the inter-dot distance were the same as those of Example 1. That is, the green reflecting laminate 36g, the blue reflecting laminate 36b, and the red reflecting laminate 36r satisfied Expression (1), (2), (3), or (4).

In addition, in a case where a difference in refractive index between the reflecting dots and the overcoat layer 18 was measured under the same conditions as those of Example, 1, the difference in refractive index was 0.02.

Next, a transparent screen was prepared under the same conditions as those of Example 1 using the green reflecting laminate 36g, the blue reflecting laminate 36b, and the red reflecting laminate 36r.

Example 4

The green reflecting dots 16g, the blue reflecting dots 16b, and the red reflecting dots 16r were formed and the green reflecting laminate 36g, the blue reflecting laminate 36b, and the red reflecting laminate 36r were prepared under the same conditions as those of Example 3, except that the liquid amount per ink droplet was randomly adjusted in a range of 4 to 20 pl instead of being randomly adjusted in a range of 4 to 40 pl in order to form the reflecting dots using the ink jet printer.

Under the same conditions as those of Example 1, cumulative distribution diagrams of the dot area and the inter-dot distance were created using a micrograph.

Figure 15:
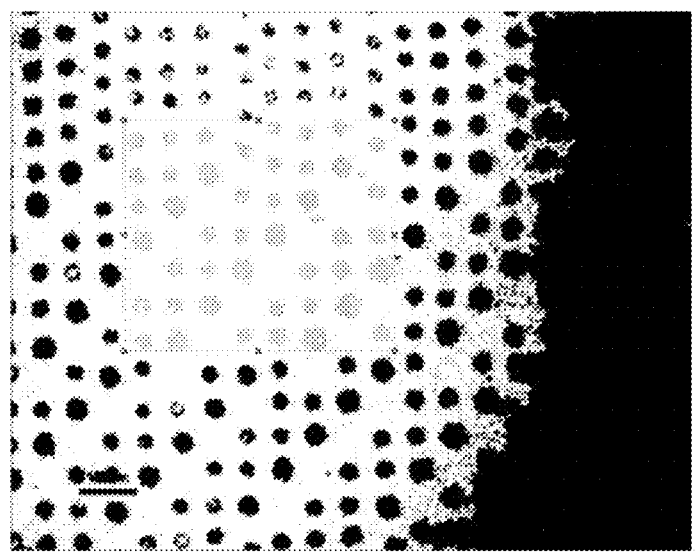
FIG. 15 is a diagram showing dots in Example of the transparent screen according to the embodiment of the present invention.

FIG. 15 shows a micrograph of the green reflecting laminate 36g. In addition, the upper column of FIG. 16 shows the cumulative distribution diagram of the dot area, and the lower column of FIG. 16 shows the cumulative distribution diagram of the inter-dot distance. The cumulative distribution diagrams of the green reflecting laminate 36g, the blue reflecting laminate 36b, and the red reflecting laminate 36r are the same.

As shown in the upper column of FIG. 16, the dot area Xs corresponding to a cumulative distribution of 50% was 605 $\mu m^2$. Therefore, Xs×0.85 was 514.3 $\mu m^2$, and Xs×1.15 was 695.8 $\mu m^2$. In addition, the dot area Ysa corresponding to a cumulative distribution of 5% was 250 $\mu m^2$, and the dot area Ysb corresponding to a cumulative distribution of 95% was 1900 $\mu m^2$. Accordingly, the green reflecting laminate 36g, the blue reflecting laminate 36b, and the red reflecting laminate 36r satisfied both Expressions (1) and (2).

In addition, as shown in the lower column of FIG. 16, the inter-dot distance Xd corresponding to a cumulative distribution of 50% was 54 μm. Therefore, Xd×0.85 was 45.9 μm, and Xd×1.15 was 62.1 μm. In addition, the inter-dot distance Yda corresponding to a cumulative distribution of 5% was 42 μm, and the inter-dot distance Ydb corresponding to a cumulative distribution of 95% was 68 μm. Accordingly, the green reflecting laminate 36g, the blue reflecting laminate 36b, and the red reflecting laminate 36r satisfied both Expressions (3) and (4).

Next, a transparent screen was prepared under the same conditions as those of Example 1 using the green reflecting laminate 36g, the blue reflecting laminate 36b, and the red reflecting laminate 36r.

Example 5

The green reflecting dots 16g, the blue reflecting dots 16b, and the red reflecting dots 16r were formed and the green reflecting laminate 36g, the blue reflecting laminate 36b, and the red reflecting laminate 36r were prepared under the same conditions as those of Example 3, except that the liquid amount per ink droplet was randomly adjusted in a range of 4 to 12 pl instead of being randomly adjusted in a range of 4 to 40 pl in order to form the reflecting dots using the ink jet printer.

Under the same conditions as those of Example 1, cumulative distribution diagrams of the dot area and the inter-dot distance were created using a micrograph.

Figure 17:
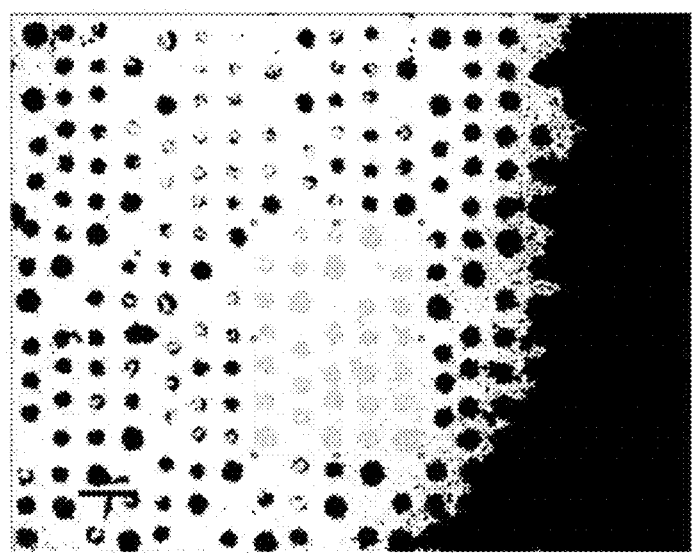
FIG. 17 is a diagram showing dots in Example of the transparent screen according to the embodiment of the present invention.

FIG. 17 shows a micrograph of the green reflecting laminate 36g. In addition, the upper column of FIG. 18 shows the cumulative distribution diagram of the dot area, and the lower column of FIG. 18 shows the cumulative distribution diagram of the inter-dot distance. The cumulative distribution diagrams of the green reflecting laminate 36g, the blue reflecting laminate 36b, and the red reflecting laminate 36r are the same.

As shown in the upper column of FIG. 18, the dot area Xs corresponding to a cumulative distribution of 50% was 650 μm². Therefore, Xs×0.85 was 552.5 μm², and Xs×1.15 was 747.5 μm². In addition, the dot area Ysa corresponding to a cumulative distribution of 5% was 460 μm², and the dot area Ysb corresponding to a cumulative distribution of 95% was 1405 μm². Accordingly, the green reflecting laminate 36g, the blue reflecting laminate 36b, and the red reflecting laminate 36r satisfied both Expressions (1) and (2).

In addition, as shown in the lower column of FIG. 18, the inter-dot distance Xd corresponding to a cumulative distribution of 50% was 54 μm. Therefore, Xd×0.85 was 45.9 μm, and Xd×1.15 was 62.1 μm. In addition, the inter-dot distance Yda corresponding to a cumulative distribution of 5% was 42 μm, and the inter-dot distance Ydb corresponding to a cumulative distribution of 95% was 68 μm. Accordingly, the green reflecting laminate 36g, the blue reflecting laminate 36b, and the red reflecting laminate 36r satisfied both Expressions (3) and (4).

Next, a transparent screen was prepared under the same conditions as those of Example 1 using the green reflecting laminate 36g, the blue reflecting laminate 36b, and the red reflecting laminate 36r.

Comparative Example 1

An overcoat layer-forming coating solution 04 was prepared under the same conditions as those of the overcoat layer-forming coating solution 01 in Example 1, except that the amount of KAYARAD DPCA-30 (manufactured by Nippon Kayaku Co., Ltd.) was changed to 60 parts by mass and the amount of the compound L was changed to 40 parts by mass.

The green reflecting dots 16g, the blue reflecting dots 16b, and the red reflecting dots 16r were formed under the same conditions as those of Example 1, except that the liquid amount per ink droplet was randomly adjusted in a range of 4 to 8 pl instead of being randomly adjusted in a range of 4 to 40 pl in order to form the reflecting dots using the ink jet printer, and further the green reflecting laminate 36g, the blue reflecting laminate 36b, and the red reflecting laminate 36r were prepared under the same conditions as those of Example 1, except that the overcoat layer-forming coating solution 04 was used instead of the overcoat layer-forming coating solution 01.

Under the same conditions as those of Example 1, cumulative distribution diagrams of the dot area and the inter-dot distance were created using a micrograph.

Figure 19:
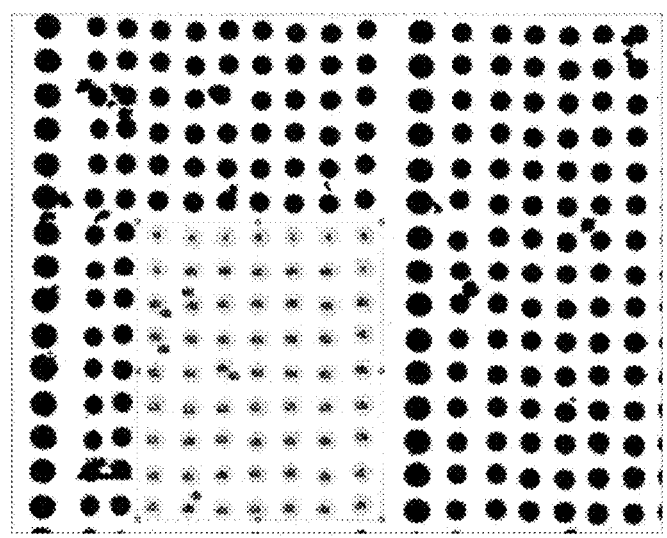
FIG. 19 is a diagram showing dots in Comparative Example of the transparent screen according to the embodiment of the present invention.

FIG. 19 shows a micrograph of the green reflecting laminate 36g. In addition, the upper column of FIG. 20 shows the cumulative distribution diagram of the dot area, and the lower column of FIG. 20 shows the cumulative distribution diagram of the inter-dot distance. The cumulative distribution diagrams of the green reflecting laminate 36g, the blue reflecting laminate 36b, and the red reflecting laminate 36r are the same.

Figure 7:
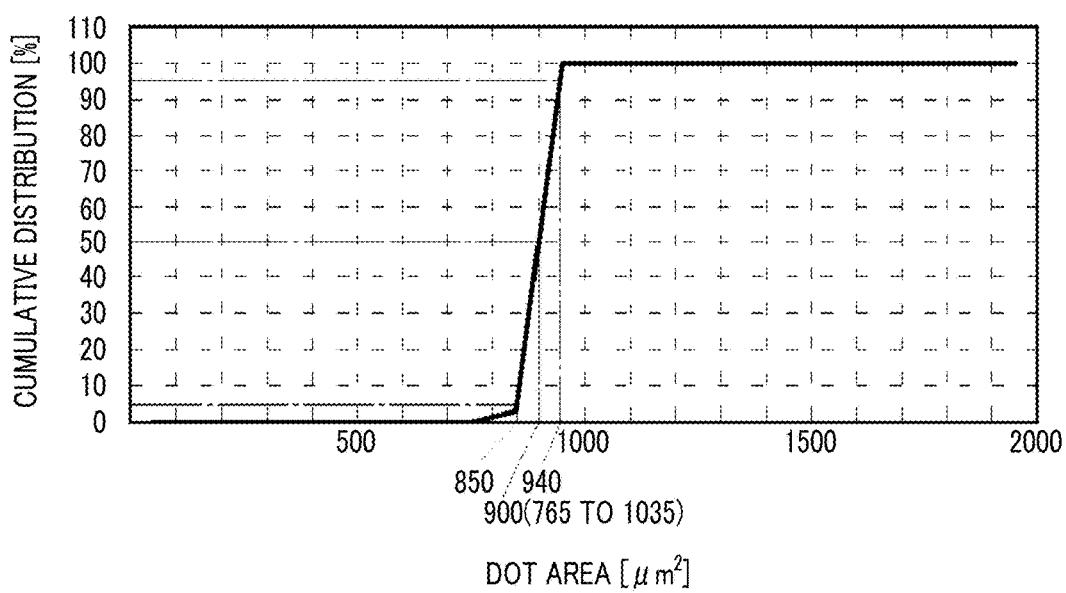
FIG. 7 is a cumulative distribution diagram of a dot area of a transparent screen of the related art.

The upper column of FIG. 20 shows the cumulative distribution diagram of the dot area which is the same as the cumulative distribution diagram of the dot area shown in FIG. 7.

That is, the dot area Xs corresponding to a cumulative distribution of 50% was 900 μm², Xs×0.85 was 765 μm², and Xs×1.15 was 1035 μm². In addition, the dot area Ysa corresponding to a cumulative distribution of 5% was 850 μm², and the dot area Ysb corresponding to a cumulative distribution of 95% was 940 μm². Accordingly, in the cumulative distribution diagram, the green reflecting laminate 36g, the blue reflecting laminate 36b, and the red reflecting laminate 36r did not satisfy both Expressions (1) and (2).

In addition, the cumulative distribution diagram of the inter-dot distance shown in the lower column of FIG. 20 is the same as the cumulative distribution diagram of the inter-dot distance shown in FIG. 9.

That is, the inter-dot distance Xd corresponding to a cumulative distribution of 50% was 55 μm. Therefore, Xd×0.85 was 46.8 μm, and Xd×1.15 was 63.3 μm. In addition, the inter-dot distance Yda corresponding to a cumulative distribution of 5% was 51 μm, and the inter-dot distance Ydb corresponding to a cumulative distribution of 95% was 59 μm. Accordingly, in the cumulative distribution diagram, the green reflecting laminate 36g, the blue reflecting laminate 36b, and the red reflecting laminate 36r did not also satisfy both Expressions (3) and (4).

In addition, in a case where a difference in refractive index between the reflecting dots and the overcoat layer 18 was measured under the same conditions as those of Example, 1, the difference in refractive index was 0.13.

Next, a transparent screen was prepared under the same conditions as those of Example 1 using the green reflecting laminate 36g, the blue reflecting laminate 36b, and the red reflecting laminate 36r.

Comparative Example 2

The green reflecting laminate 36g, the blue reflecting laminate 36b, and the red reflecting laminate 36r were prepared under the same conditions as those of Comparative Example 1, except that the overcoat layer-forming coating solution 03 used in Example 3 was used instead of the overcoat layer-forming coating solution 04, and further a transparent screen was prepared under the same conditions as those of Example 1.

In a case where the dot area and the inter-dot distance were measured under the same conditions as those of Example 1, the obtained cumulative distribution diagrams of the dot area and the inter-dot distance were the same as those of Comparative Example 1. That is, the green reflecting laminate 36g, the blue reflecting laminate 36b, and the red reflecting laminate 36r did not satisfy Expressions (1) to (4).

In addition, in a case where a difference in refractive index between the reflecting dots and the overcoat layer 18 was measured under the same conditions as those of Example, 1, the difference in refractive index was 0.02.

Next, a transparent screen was prepared under the same conditions as those of Example 1 using the green reflecting laminate 36g, the blue reflecting laminate 36b, and the red reflecting laminate 36r.

[Evaluation]

<Haze>

Regarding the prepared transparent screen, the haze was measured using a haze meter NDH-2000 (manufactured by Nippon Denshoku Industries Co., Ltd.).

<Color Unevenness of Transmitted Light>

A light emitting diode (LED) point light source was lighted, and the LED point light source was observed by visual inspection through the prepared transparent screen to evaluate color unevenness around transmitted light of the LED light source. The evaluation is as follows.

5 points: substantially no color unevenness was observed 4 points: a small amount of color unevenness was observed 3 points: color unevenness was observed 2 points: a large amount of color unevenness was observed 1 point: an extremely large amount of color unevenness was observed <Spreading of Transmitted Light>

Using a laser pointer (LP110S-CW, manufactured by Nippon Systems Corporation), laser light was made to be incident from the convex side of the reflecting dots to the transparent screen, white paper was placed at a position at a distance of 30 cm from the transparent screen, and the spreading of transmitted light projected on the white paper was measured using a ruler.

The results are shown in Table 1 below.

Figure 21:
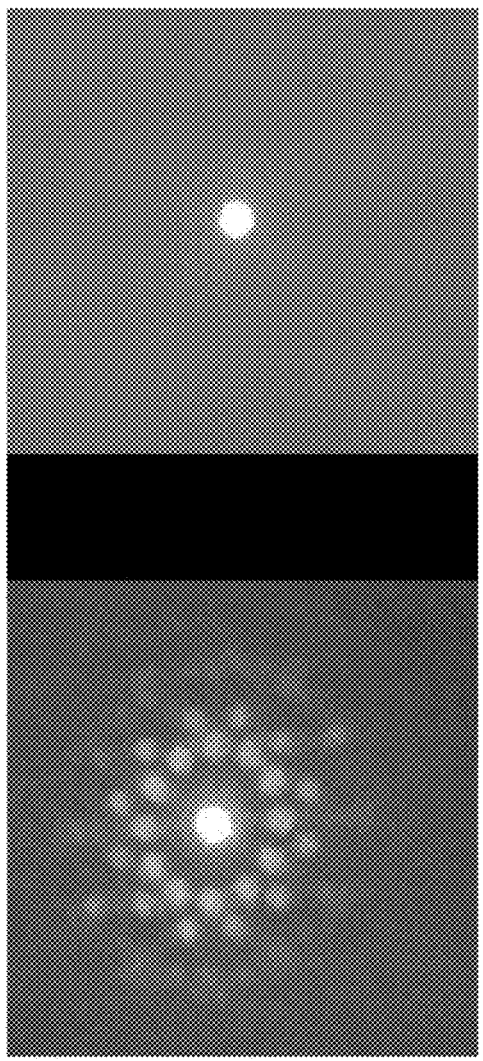
FIG. 21 is a diagram showing transmitted light in Example and Comparative Example of the transparent screen according to the embodiment of the present invention.

In addition, the upper column of FIG. 21 shows an image obtained in Example 1 for evaluating the color unevenness of transmitted light, and the lower column of FIG. 21 shows an image obtained in Comparative Example 2 for evaluating the color unevenness of transmitted light.

TABLE 1

| | Cumulative Distribution of Dot Area [µm$^2$] | | | | Cumulative Distribution of Inter-Dot Distance [µm] | | | | Difference in Refractive Index | | Evaluation Color | |
|---|---|---|---|---|---|---|---|---|---|---|---|---|
| | 50% | 50% ± 15% | 5% | 95% | 50% | 50% ± 15% | 5% | 95% | | Haze | Unevenness | Spreading |
| Example 1 | 420 | 357 to 483 | 295 | 1450 | 39 | 33.2 to 44.9 | 26 | 57 | 0.09 | 2.5 | 4 Points | 8 mm |
| Example 2 | 420 | 357 to 483 | 295 | 1450 | 39 | 33.2 to 44.9 | 26 | 57 | 0.04 | 2.0 | 4 Points | 6 mm |
| Example 3 | 420 | 357 to 483 | 295 | 1450 | 39 | 33.2 to 44.9 | 26 | 57 | 0.02 | 1.5 | 5 Points | 2 mm |
| Example 4 | 605 | 514.3 to 695.8 | 250 | 1900 | 54 | 45.9 to 62.1 | 42 | 68 | 0.02 | 2.0 | 4 Points | 4 mm |
| Example 5 | 650 | 552.5 to 747.5 | 460 | 1405 | 54 | 45.9 to 62.1 | 42 | 68 | 0.02 | 2.0 | 4 Points | 5 mm |
| Comparative Example 1 | 900 | 765 to 1035 | 850 | 940 | 55 | 46.8 to 63.3 | 51 | 59 | 0.13 | 3.5 | 1 Point | 60 mm |
| Comparative Example 2 | 900 | 765 to 1035 | 850 | 940 | 55 | 46.8 to 63.3 | 51 | 59 | 0.02 | 3.0 | 2 Points | 40 mm |

As shown in Table 1 and the lower column of FIG. 21, regarding each of the transparent screens according to Comparative Examples 1 and 2 in which the reflecting dots (array of the reflecting dots) did not satisfy Expressions (1) to (4), that is, the reflecting dots were regularly formed, a large amount of color unevenness occurred in a case where the LED light source was observed through the transparent screen, or the spreading of the transmitted light of the laser light occurred. That is, in a case where scenery was observed through the transparent screen, color unevenness or the like occurred, and thus the scenery was not able to be appropriately observed.

On the other hand, regarding the transparent screen according to the present invention in which the reflecting dots (array of the reflecting dots) satisfied Expression (1), (2), (3), or (4), that is, the reflecting dots were randomly formed, as shown in Table 1 and the upper column of FIG. 21, color unevenness was suppressed in a case where the LED light source was observed through the transparent screen, or the spreading of the transmitted light of the laser light was suppressed. That is, it can be seen that scenery was able to be appropriately observed through the transparent screen.

In addition, in Examples 1 to 3, by reducing the difference in refractive index between the reflecting dots and the overcoat layer, the haze of the transparent screen was able to be suppressed.

Example 6

The red reflecting laminate 36r was prepared under the same conditions as those of Example 3, except that, in the preparation of the red reflecting laminate 36r of Example 3, the cholesteric liquid crystal ink solution rR for forming the red reflecting dots 16r was jetted according to the design including A, B, and C shown in the upper column of FIG. 22.

In addition, the blue reflecting laminate 36b was prepared under the same conditions as those of Example 3, except that, in the preparation of the blue reflecting laminate 36b of Example 3, the cholesteric liquid crystal ink solution bR for forming the blue reflecting dots 16b was jetted according to a design including A and C shown in the middle column of FIG. 22.

Further, the green reflecting laminate 36g was prepared under the same conditions as those of Example 3, except that, in the preparation of the green reflecting laminate 36g of Example 3, the cholesteric liquid crystal ink solution gR for forming the green reflecting dots 16g was jetted according to the design including A and C shown in the middle column of FIG. 22.

Next, a transparent poster was prepared under the same conditions as those of Example 1 using the green reflecting laminate 36g, the blue reflecting laminate 36b, and the red reflecting laminate 36r.

The prepared transparent screen was irradiated with diffused light from a diffuse light source. As a result, as shown in the lower column of FIG. 22, B was displayed red (oblique line), and A and C were displayed white, and a design including A, and B, and C was displayed.

In addition, in a state where diffused light was not irradiated, the film had low haze and excellent transparency as in the case of the transparent screen according to Example 3.

As can be seen from the above results, the effects of the present invention are obvious.

EXPLANATION OF REFERENCES 10, 30: image display system
12, 32, 100: transparent screen
14, 104: support
16, 16-1, 16-2, 102: dot
16b: blue reflecting dot
16g: green reflecting dot
16r: red reflecting dot
18: overcoat layer
24, 34: projector
36b: blue reflecting laminate
36g: green reflecting laminate
36r: red reflecting laminate
C: circle
O: center
In, Ip: light
Ir; reflected light
$Ld_1$, $Ld_2$: dark portion
$Yd_1$, $Yd_2$: inter-dot distance

What is claimed is:

1. A transparent film comprising:
a support;
a dot array that is formed on one main surface of the support and in which dots obtained by immobilizing a cholesteric liquid crystalline phase are two-dimensionally arranged; and
an overcoat layer that covers the dot array and is laminated on the support,
wherein in a case where, in a cumulative distribution diagram in which a horizontal axis represents an area of the dots, an area of the dots corresponding to a cumulative distribution of 50% is represented by Xs, an area of the dots corresponding to a cumulative distribution of 5% is represented by Ysa, and an area of the dots corresponding to a cumulative distribution of 95% is represented by Ysb, and
in a case where, in a cumulative distribution diagram in which a horizontal axis represents an inter-dot distance as a distance between one dot and another dot that is most adjacent to the dot, an inter-dot distance corresponding to a cumulative distribution of 50% is represented by Xd, an inter-dot distance corresponding to a cumulative distribution of 5% is represented by Yda, and an inter-dot distance corresponding to a cumulative distribution of 95% is represented by Ydb, the dot array satisfies at least one of the following Expression (1), (2), (3), or (4), $$Xs \times 0.85 > Ysa \qquad \text{Expression (1)},$$

$$Xs \times 1.15 < Ysb \qquad \text{Expression (2)},$$

$$Xd \times 0.85 > Yda \qquad \text{Expression (3), and}$$

$$Xd \times 1.15 < Ydb \qquad \text{Expression (4)}.$$

2. The transparent film according to claim 1, wherein a difference between an average refractive index of the dots and a refractive index of the overcoat layer is 0.1 or lower.

3. The transparent film according to claim 1, wherein each of the dots has a stripe pattern including bright portions and dark portions in a cross-section, and
an angle between a normal line perpendicular to a line, which is formed using a first dark portion from a surface of the dot, and the surface of the dot is 70° to 90°.

4. The transparent film according to claim 1, wherein an average of the inter-dot distances of the dots is 10 to 100 μm, and
an average dot diameter of the dots is 10 to 100 μm.

5. The transparent film according to claim 1, wherein the dots satisfy at least one of Expression (3) or (4).

6. A transparent screen that is formed of the transparent film according to claim 1.

7. An image display system comprising:
a transparent screen that is formed of the transparent film according to claim 1; and
a projector.

8. A transparent poster that is formed of the transparent film according to claim 1,
wherein the dots in the dot array are formed in an image shape.

* * * * *